United States Patent
Nelson et al.

(10) Patent No.: US 10,198,518 B2
(45) Date of Patent: Feb. 5, 2019

(54) FILTERING SEARCH RESULTS USING CURRENT SOFTWARE APPLICATION STATES

(71) Applicant: Samsung Electronics Co., Ltd., Suwon-si, Gyeonggi-do (KR)

(72) Inventors: Joseph Nelson, San Francisco, CA (US); Jason Hreha, Danville, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 14/980,048

(22) Filed: Dec. 28, 2015

(65) Prior Publication Data

US 2016/0378840 A1 Dec. 29, 2016

Related U.S. Application Data

(60) Provisional application No. 62/183,527, filed on Jun. 23, 2015.

(51) Int. Cl.
    *G06F 7/02* (2006.01)
    *G06F 17/30* (2006.01)
    *G06N 99/00* (2010.01)

(52) U.S. Cl.
    CPC .. *G06F 17/30867* (2013.01); *G06F 17/30528* (2013.01); *G06F 17/30554* (2013.01); *G06N 99/005* (2013.01)

(58) Field of Classification Search
    CPC ......... G06F 17/30554; G06F 17/30864; G06F 17/30867; G06F 17/3053; G06F 17/30961; G06F 17/30598; G06F 17/30528; G06N 99/005
    See application file for complete search history.

(56) References Cited

U.S. PATENT DOCUMENTS

| | | | |
|---|---|---|---|
| 9,244,994 B1 * | 1/2016 | Adoc, Jr. | G06F 17/30345 |
| 2013/0173774 A1 * | 7/2013 | Carter | H04L 67/142 709/223 |
| 2014/0237296 A1 * | 8/2014 | Shanahan | G06F 11/3624 714/38.14 |
| 2015/0007026 A1 * | 1/2015 | Satow | G06F 3/0484 715/708 |
| 2016/0357871 A1 * | 12/2016 | Prakash | G06F 17/30867 |

* cited by examiner

*Primary Examiner* — Bruce M Moser
(74) *Attorney, Agent, or Firm* — Jefferson IP Law, LLP

(57) ABSTRACT

Techniques include receiving a search query from a user device, receiving an indication of a current application (app) state of a native app executing on the device from the device, and identifying app state records based on the query and the indication. Each app state record includes an app access mechanism (AAM) and app state information (ASI). The AAM references the native app executing on the user device and indicates operations for the app to perform. The ASI describes an app state of the app after performing the operations. Identifying each app state record based on the indication includes determining that the current app state is a parent app state of the app state described by the ASI included in the identified record. The techniques further include selecting the AAMs from the identified app state records and transmitting the selected AAMs to the user device.

18 Claims, 17 Drawing Sheets

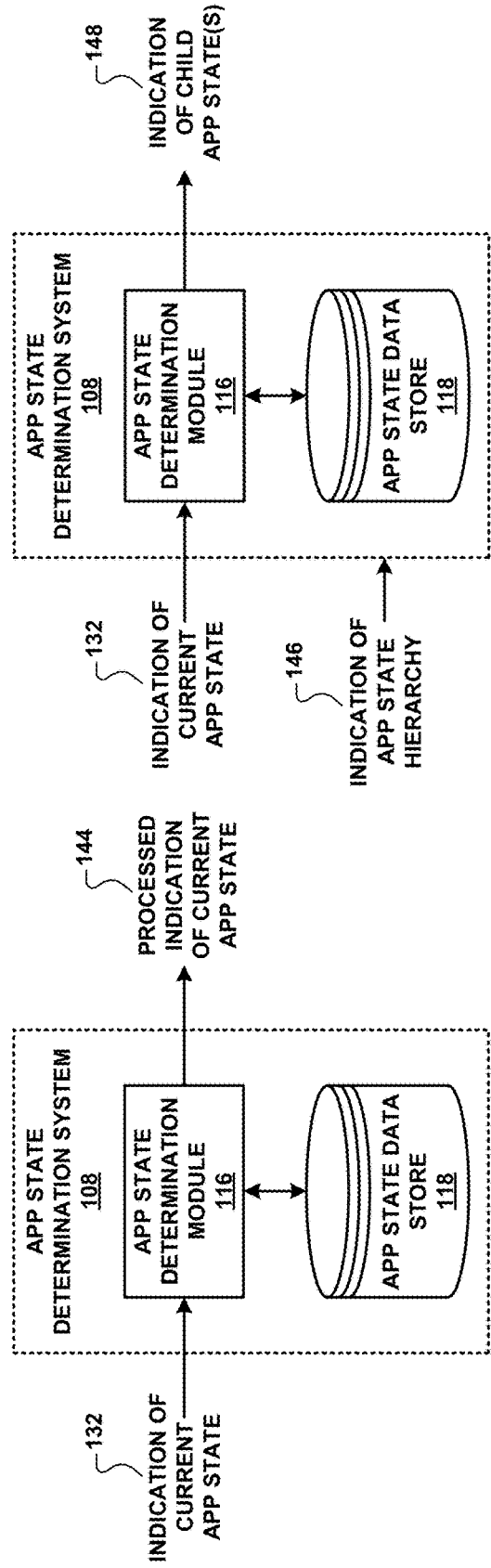

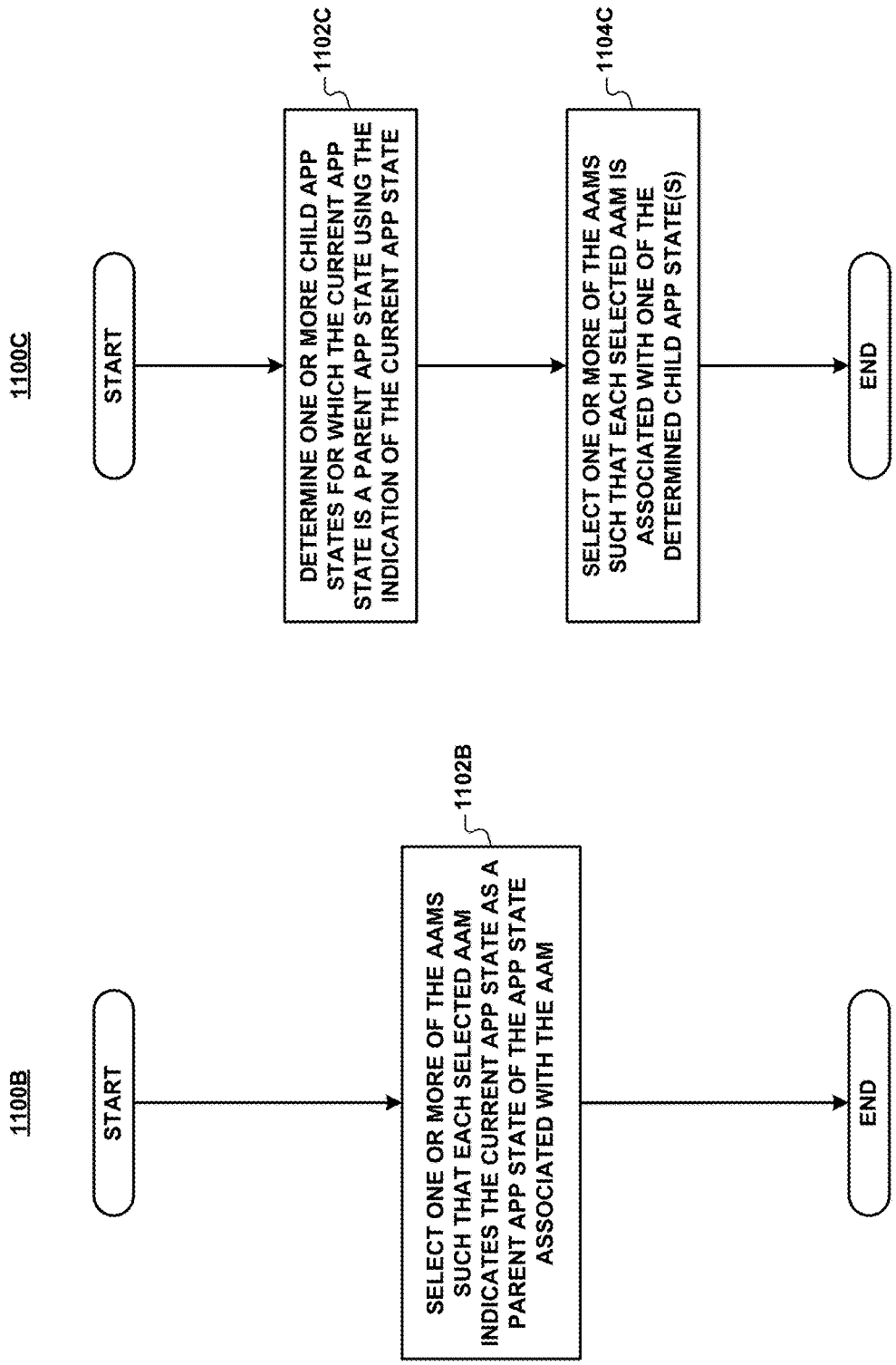

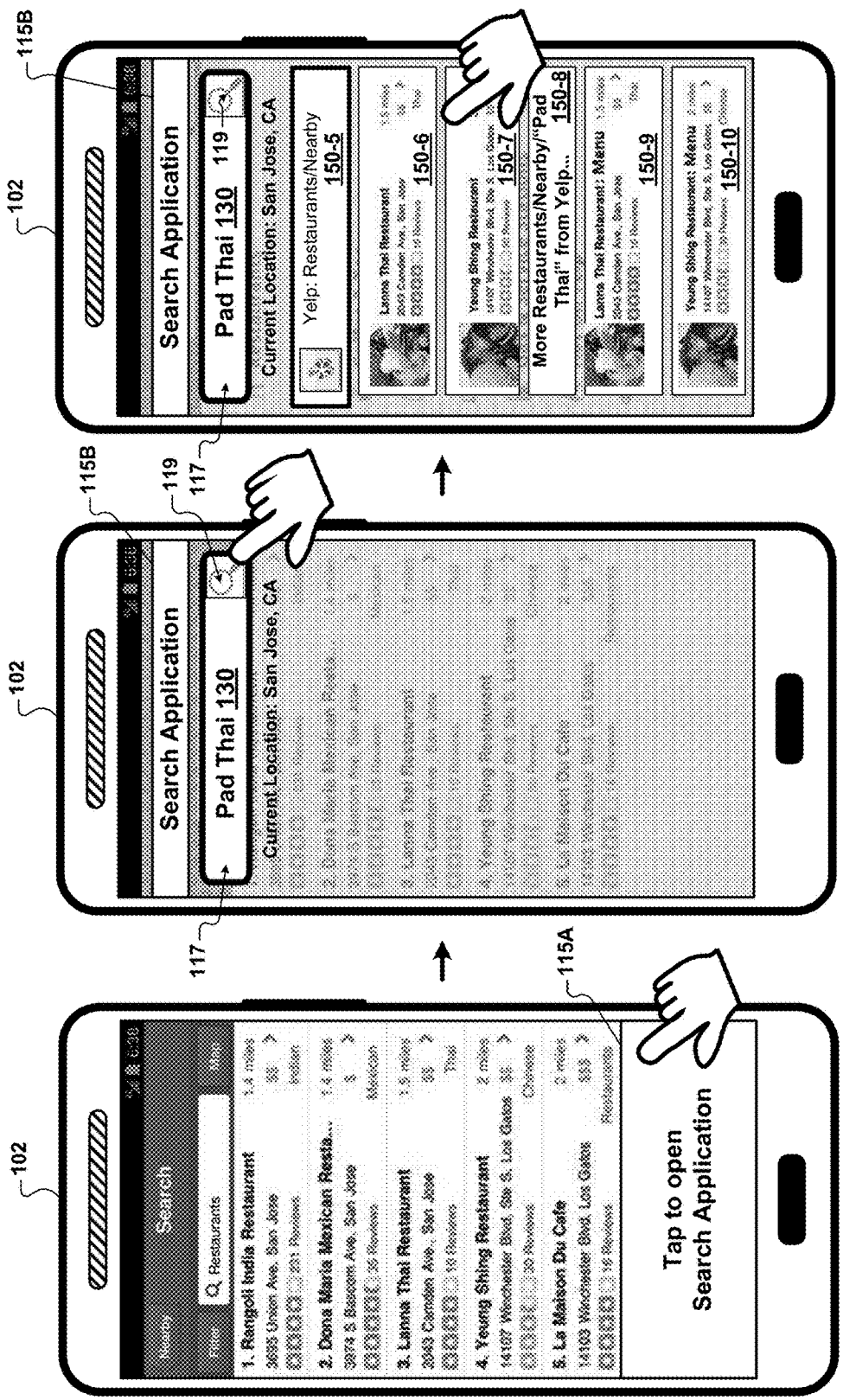

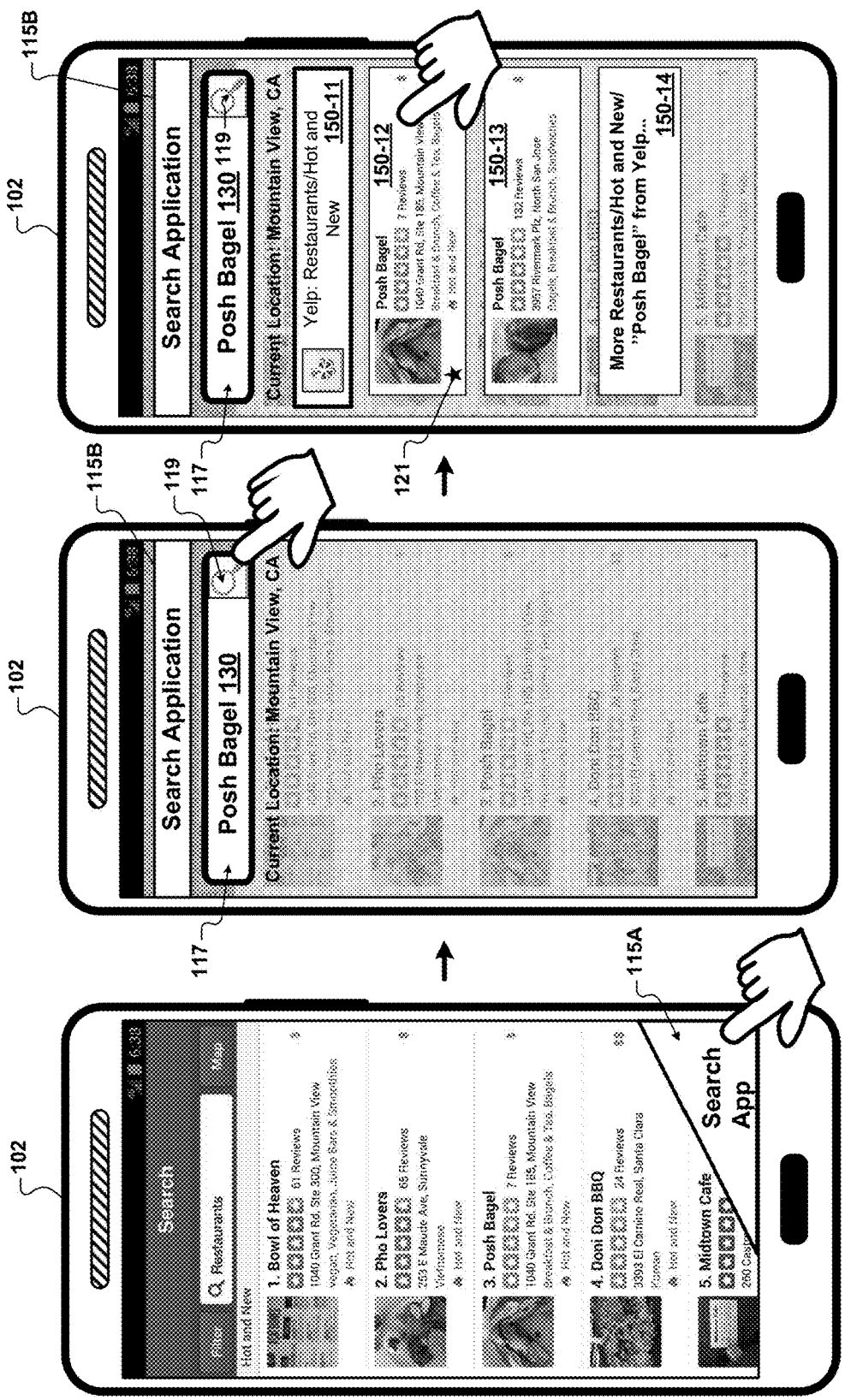

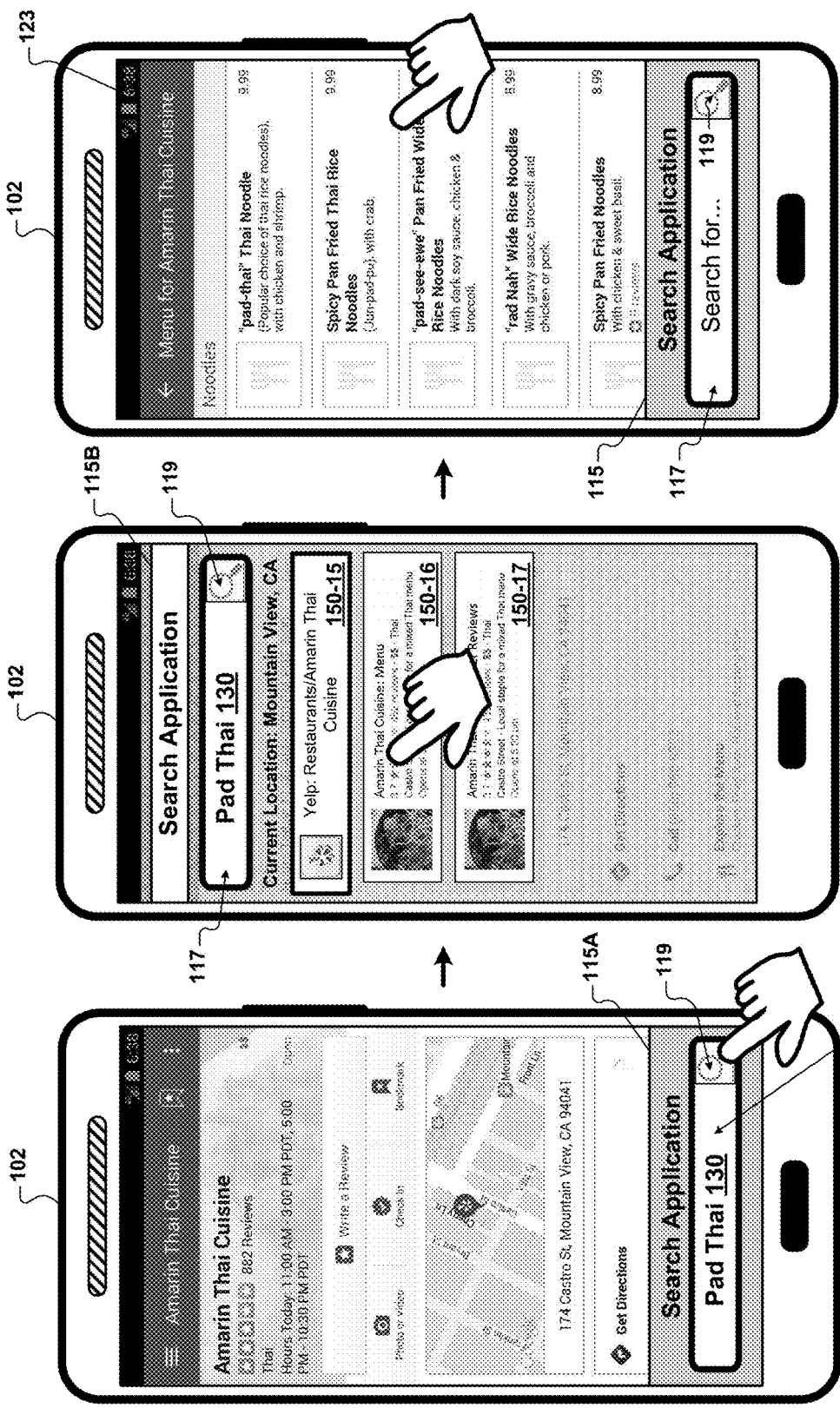

FILTERING SEARCH RESULTS USING CURRENT SOFTWARE APPLICATION STATES

CROSS-REFERENCE TO RELATED APPLICATION

This application claims the benefit of U.S. Provisional Application No. 62/183,527 filed Jun. 23, 2015, which is hereby incorporated by reference in its entirety.

TECHNICAL FIELD

This disclosure generally relates to the field of search, and more particularly to techniques for generating search results that correspond to states of software applications.

BACKGROUND

In recent years, the use of computers, smartphones, and other Internet-connected computing devices has grown significantly. Correspondingly, the number of software applications (apps) available for such devices has also grown. Today, many diverse software apps can be accessed on a number of different computing devices, including smartphones, personal computers, automobiles, and televisions. These software apps can include business driven apps, games, educational apps, news apps, shopping apps, messaging apps, media streaming apps, and social networking apps, as some examples. Because of the large number of software apps available today and the wide range of functionality they provide, computing device users often require the ability to search for and access specific software app functionality.

SUMMARY

In one example, a method includes receiving a search query from a user device, receiving an indication of a current application (app) state of a native app executing on the device from the device, and identifying one or more app state records based on the query and the indication. In this example, each identified app state record includes an app access mechanism (AAM) and app state information (ASI). The AAM references the native app executing on the user device and indicates one or more operations for the app to perform. The ASI describes an app state of the native app after the app has performed the operations. Also in this example, identifying each app state record based on the indication includes determining that the current app state is a parent app state of the app state described by the ASI included in the identified record. The method further includes selecting the one or more AAMs from the identified app state records and transmitting the selected AAMs to the user device.

In another example, a method includes transmitting, using a user device, a search query to a search system and receiving search results from the system at the device in response to transmitting the query. In this example, the search results include AAMs that each reference a native app and indicate one or more operations for the app to perform. Also in this example, the nave app performing the operations sets the app into an app state of the app. The method further includes determining, using the user device, a current app state of a native app executing on the device. The method still further includes selecting, using the user device, one or more of the AAMs based on the current app state. In this example, selecting each AAM includes determining that the current app state is a parent app state of the app state associated with the AAM. The method also includes displaying the selected AAMs at the user device.

In another example, a system includes one or more computing devices configured to receive a search query from a user device, receive an indication of a current app state of a native app executing on the device from the device, and identify one or more app state records based on the query and the indication. In this example, each identified app state record includes an AAM and ASI. The AAM references the native app executing on the user device and indicates one or more operations for the app to perform. The ASI describes an app state of the native app after the app has performed the operations. Also in this example, to identify each app state record based on the indication, the devices are configured to determine that the current app state is a parent app state of the app state described by the ASI included in the identified record. The devices are further configured to select the one or more AAMs from the identified app state records and transmit the selected AAMs to the user device.

BRIEF DESCRIPTION OF DRAWINGS

The details of one or more examples are set forth in the accompanying drawings and the description below. Other features, objects, and advantages will be apparent from the description and drawings, and from the claims.

FIGS. 4A-4B are functional block diagrams of app state determination systems.

FIGS. 11A-11C are flow diagrams that illustrate example methods for generating search results using a search query and an indication of a current app state at a user device.

FIGS. 12A-15C depict example graphical user interfaces (GUIs) that may be generated on a user device according to the present disclosure.

DETAILED DESCRIPTION

Figure 1:
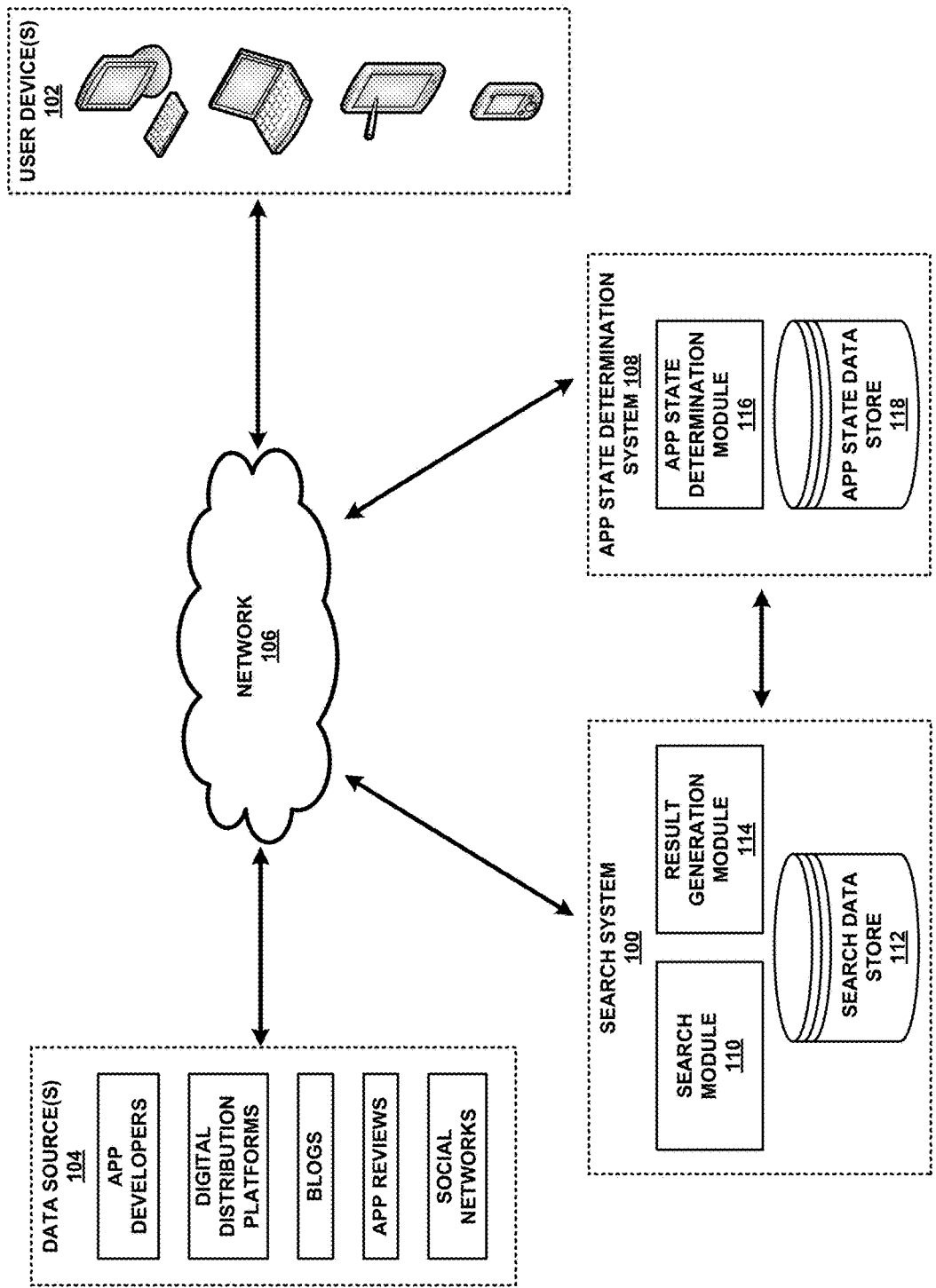
FIG. 1 illustrates an example environment that includes a search system, an application (app) state determination system, one or more user devices, and one or more data sources that communicate via a network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of search, and, more particularly, to techniques for generating and displaying search results at a computing device based on a current application (app) state of a software app executing on the device. Using the techniques described herein may, in some examples, improve search query understanding and search result relevance. For example, the techniques include, while performing a search for app states of software apps based on a user's search query, using an app state of a software app executing on the user's device at the time of the search (e.g., the user's "current app state") to filter results of the search. In particular, the techniques include limiting the search results to those that specify app states of the software app executing on the user's device that are also forward-reachable from (e.g., lower in an app state hierarchy, or deeper than) the user's current app state. The techniques also include optionally ranking the search results by their associated user interaction distances (e.g., by the number of user interactions required to reach each corresponding app state) from the current app state and, in some examples, by their relevance to the search query.

According to the disclosed techniques, initially, a user of a user device may interact with a so-called "native" app executing on the device. For example, the user may set the native app into a particular app state via the user's interaction. The app state of the native app displayed on the user device may be referred to herein as a "current app state." While the user device (e.g., the native app) displays the current app state, the user may further cause the device to launch a search app (e.g., a native or web-based app that enables the user to perform searches on the device). As a result, the user device may launch and execute the search app while continuing to execute the current app state. For example, the user device may display a GUI of the launched search app, with the current app state displayed below, or in the background of, the GUI. The user may then input a search query (e.g., a text string) into a search field of the GUI and cause the user device to transmit the query and an indication of the current app state to a search system. The search system may receive the search query and the indication from the user device and generate search results that are responsive to (e.g., that provide the functionality described by) the query and specify app states that are forward-reachable from (e.g., via one or more user interactions with) the current app state. For example, the search results may each specify an app state of the native app associated with the current app state that provides the functionality described by the search query, and for which the current app state is a so-called "parent" app state. In other words, the current app state may be higher in an app state hierarchy, or shallower, than the app state specified by each search result. Examples of parent app states and app states that are forward-reachable from other app states (e.g., reachable from the other app states without accessing any previously-accessed app states) are described herein.

The search system may transmit the search results to the user device. The user device may display the search results to the user (e.g., as one or more user selectable links). The user device may also optionally rank the search results based on user interaction distances of the corresponding app states from the current app state and/or relevance of the results to the search query, as described herein. The user may select one or more of the search results (e.g., the user selectable links). Upon the user selecting a particular search result (e.g., an associated user selectable link), the user device may set the native app associated with the current app state (e.g., which may still be executing on the device) into an app state specified by the selected result, which may be forward-reachable from the current app state. The user may then interact with the app state (e.g., preview the state, or perform a function provided by the state).

In other examples, the user device may receive search results from the search system that are responsive to the search query and use the indication of the current app state to filter the results to those that specify app states that are forward-reachable from the current app state, in a similar manner as described above. The user device may then optionally rank the search results based on user interaction distances of the corresponding app states from the current app state and/or relevance of the results to the search query, also in a similar manner as described above.

In this manner, the techniques described herein may improve search query understanding and search result relevance. For example, the current app state of the native app executing on the user device may indicate the user's activity with respect to the app prior to and/or at the time of invoking the search app. For instance, the current app state may indicate whether, at the time of invoking the search app, the user was interacting with a main page of the native app, or a specific page of (e.g., an entry for a particular business, product, or service in) the app. As such, the current app state may indicate the user's need for specific functionality associated with the current app state. Moreover, the user invoking the search app after interacting with the current app state may also indicate the user's dissatisfaction with the functionality provided by the state and further need for other functionality that may be provided by deeper app states of the same native app. Accordingly, the current app state may serve as valuable contextual data related to the user and the user's behavior (e.g., the user's intent, or need) with respect to the search query. By identifying app states of native apps that are both responsive to (e.g., match) the search query and are forward-reachable by the user from the current app state, the techniques may enable generating search results that are more relevant to the query than those generated using the query alone. Additionally, by optionally ranking the identified app states by user interaction distance (e.g., by promoting app states reachable via fewer user interactions from the current app state in the native app already executing on the user device), the technique may further enhance the user's experience.

FIG. 1 is a functional block diagram that illustrates an example environment including a search system 100, an app state determination system 108, one or more user devices 102, and one or more data sources 104 that communicate via a network 106. The network 106 through which the above-described systems and devices communicate may include any type of network, such as a local area network (LAN), a wide area network (WAN), and/or the Internet. As shown in FIG. 1, the search system 100 includes a search module 110, a search data store 112, and a result generation module 114, which are described in greater detail herein. As also shown, the app state determination system 108 includes an app state determination module 116 and an app state data store 118, which are also described in greater detail herein. In some examples, the app state determination system 108 may be a part of the search system 100, a part of another system or device, or a stand-alone system or device.

In the example of FIG. 1, the search system 100 receives a search query and, e.g., an indication of a current app state, from one of the user device(s) 102 and generates search results in response to receiving the query and, e.g., the indication. Specifically, the search system 100 generates the search results based on the search query and, e.g., the indication, as well as using information included in one or more app state records stored in the search data store 112. In this example, each app state record may specify an app state of a native app. The information included in the app state records may include one or more access mechanisms (AMs) that enable the user device(s) 102 to access the app states specified by the records. The search system 100 transmits the AMs included in the app state records to the user device 102 as the search results, as described herein. The information may also include app state information (ASI) (e.g., text) and other information (e.g., app state identifiers (IDs) and indications of parent app states), which the search system 100 may use to identify the app state records in the search data store 112, as also described herein. The search system 100 transmits the search results, including the AMs, to the user device 102. The user device 102 displays the search results to a user of the device 102 as one or more user selectable links that include the AMs.

In this disclosure, an app may refer to computer software that causes a computing device (e.g., one of the user device(s) 102) to perform a task. In some examples, an app may be referred to as a "program." Example apps include word processing apps, spreadsheet apps, messaging apps, media streaming apps, social networking apps, and games. Apps can be executed on a variety of different computing devices, including mobile computing devices, such as smartphones, tablets, and wearable computing devices (e.g., smart headsets and/or smart watches). Apps can also be executed on other types of computing devices having other form factors, such as laptop computers, desktop computers, or other consumer electronic devices. In some examples, apps may be installed on a computing device prior to a user purchasing the device. In other examples, the user may download and install apps on the computing device after purchasing the device. A native app, as used herein, may refer to an app that is installed and executed on a user device 102. A web-based app, in turn, may refer to an app that is accessible from a user device 102 via a web browser app included on the device 102.

An AM, as used herein, may include any of a native app AM (hereinafter, "app AM," or "AAM"), a web AM (hereinafter, "WAM"), and an app download address (ADA). As such, a user device 102 of the present disclosure may use an AM to access the functionality provided by a native or a web-based app. For example, a user of the user device 102 may select a user selectable link that includes the AM to access the functionality of the app.

An AAM may be a string that references a native app and indicates one or more operations for a user device 102 (e.g., the app) to perform. If a user of the user device 102 selects a user selectable link that includes the AAM, the device 102 may launch the native app and (e.g., cause the app to) perform the operations. In other words, the user selecting the user selectable link may cause the user device 102 to launch the native app and set the app into an app state (e.g., in which the app displays a GUI, or screen) that corresponds to the operations. As a result, the native app may be configured to display one or more products, services, or vendors, to the user, e.g., via a display device of the user device 102. In this manner, the AAM may specify the app state of the native app. The app state, in turn, may refer to the operations indicated by the AAM and/or the outcome of the native app performing the operations in response to the user selecting the user selectable link that includes the AAM.

A WAM may include a resource identifier that references a web resource (e.g., a page of a web-based app, or website). For example, the WAM may include a uniform resource locator (URL) (i.e., a web address) used with the hypertext transfer protocol (HTTP). If a user of a user device 102 selects a user selectable link that includes the WAM, the device 102 may launch a web browser app included on the device 102 and retrieve the web resource referenced by the resource identifier. Stated another way, if the user selects the user selectable link, the user device 102 may launch the web browser app and access an app state (e.g., a page) of a web-based app, or website, specified by the WAM. In some examples, a WAM included in an app state record with an AAM may specify an app state of a web-based app that is an equivalent of (e.g., analogous to) an app state of a native app specified by the AAM.

An ADA may specify a location (e.g., a digital distribution platform, such as Google Play® by Google Inc.) where a native app (e.g., a native app referenced by an AAM) may be downloaded. In some examples, an app state record may include an ADA with an AAM (and, e.g., a WAM). In these examples, the ADA may specify a location from which a native app referenced by the AAM may be downloaded.

In some examples, the search system 100 may transmit the search results, including the AMs, to the user device 102 with additional data. For example, the search system 100 may transmit link (e.g., text and/or image) data that the user device 102 may use to generate the user selectable links for the AMs included in the search results. Each user selectable link may include a portion of the link (e.g., text and/or image) data that the user of the user device 102 may select (e.g., touch, or "click on"). Each user selectable link may also be associated with one or more of the AMs included in the search results, such that when the user selects the link, the user device 102 launches a native or web-based app referenced by the corresponding AM(s) and causes the app to perform one or more operations indicated by the AM(s). The text and/or image data of the user selectable link may indicate the operations or function that the native or web-based app performs in response to selection of the link. For example, if the user selectable link is for a song in a native or web-based music player app, the text and/or image data may indicate that the user device 102 will launch the app and that the app will play the song when the user selects the link. In some examples, when the user selects the user selectable link, the user device 102 downloads a native app referenced by the corresponding AM(s) and installs the app on the device 102. Example user selectable links are described with reference to FIGS. 12A-15C.

As described herein, the search system 100 uses data (e.g., app state records) included in the search data store 112 to generate search results based on search queries and, e.g., indications of current app states, received from the user device(s) 102. The search data store 112 may include one or more databases, indices (e.g., inverted indices), tables, files, or other data structures that may be used to implement the techniques of this disclosure. In some examples, the search data store 112 may be included in one or more storage devices. The search data store 112 includes one or more app state records. Each app state record may include data related to a function of a native app and/or to an app state of the app resulting from the app performing the function. For example, each app state record may include, among other content, an app state ID, ASI, and one or more AMs. An app state ID of an app state record may uniquely identify the record among other app state records included in the search data store 112. ASI of an app state record may describe an app state into which an app is set according to one or more AMs included in the record. An AM (e.g., an AAM, or a WAM) of an app state record may include data (e.g., an alphanumeric string) that causes a user device 102 to launch a native or web-based app and perform a function associated with the app. In some examples, an AM of an app state record may include data (e.g., an ADA) that enables a user device 102 to download and install a native app on the device 102. Example app state records are described with reference to FIGS. 5A-5B.

As described herein, the search system 100 receives the search query and, e.g., the indication of the current app state, from the user device 102 and generates the search results based on the query and, e.g., the indication. The search query may include text, numbers, and/or symbols (e.g., punctuation) entered into the user device 102 by the user. For example, the user may have entered the search query into a search field, or "search box," of a search app included on the user device 102. The user may have entered the search query using a touchscreen keypad, a mechanical keypad, and/or via speech recognition techniques and transmitted the query to the search system 100 using the search app. In some examples, the search app may be a native app dedicated to search, or a more general app, such as a web browser app. The indication of the current app state may include text, numbers, and/or symbols (e.g., punctuation), as well as any machine-readable (e.g., binary) data used by the user device 102 (e.g., the search app) to represent the state (e.g., an app state ID, an AAM, and/or one or more operations associated with the state), as described herein. In some examples, the search app may determine the current app state and transmit the indication to the search system 100 (e.g., with the search query).

In some examples, the user device 102 may transmit additional data to the search system 100 with the search query and, e.g., the indication of the current app state. The search query, the indication, and the additional data may be referred to herein as a query wrapper. The additional data may include geo-location data associated with the user device 102, platform data for the device 102 (e.g., a type and/or a version of the device 102, an operating system (OS), and/or a web browser app of the device 102), an identity of the user (e.g., a username), partner specific data, and other data. The user device 102 may transmit the query wrapper to the search system 100, which may use the search query, the indication, and/or the additional data included in the wrapper to generate the search results and provide the results to the device 102.

To generate the search results, the search module 110 may identify one or more app state records included in the search data store 112 based on the search query and, e.g., the indication of the current app state. Initially, the search module 110 may analyze the search query. The search module 110 may then identify one or more app state records included in the search data store 112 based on the (e.g., analyzed) search query and, e.g., the indication. For example, the search module 110 may identify the app state records based on (e.g., text) matches between terms of the search query and terms of information included in the records. In some examples, the search module 110 may further identify the app state records based on matches between the indication (or, e.g., information generated using the indication) and information included in the records. The search module 110 may then process (e.g., score) the identified app state records. For example, the search module 110 may determine how well the identified app state records match the search query. The search module 110 may then select one or more of the identified app state records that best match the search query and transmit indications of the selected records to the result generation module 114.

The result generation module 114 may identify the app state records selected by the search module 110 in the search data store 112 using the received indications. The result generation module 114 may then select one or more AMs (e.g., AAMs, WAMs, and/or ADAs) from the identified app state records. The result generation module 114 may transmit the selected AMs to the user device 102 as the search results. In some examples, the result generation module 114 may transmit additional data with the AMs to the user device 102. For example, as described herein, the search module 110 may generate result scores for the app state records from which the AMs are selected (e.g., using values of metrics associated with the persons, places, or things described in the records and/or various features of the search query). As such, each AM may be associated with a result score that indicates a rank of the AM relative to the other AMs. In some examples, the result generation module 114 may transmit the result scores associated with the AMs to the user device 102 with the AMs. In other examples, the result generation module 114 may transmit link data and/or indications of user interaction distances associated with the AMs (e.g., with the corresponding app state records and app states specified by the records) to the user device 102, as also described herein.

The user device(s) 102 may be any computing devices capable of providing search queries and, e.g., indications of current app states, to the search system 100 (and, e.g., the app state determination system 108) and receiving search results from the search system 100. The user device(s) 102 may include any of smartphones, and tablet, laptop, or desktop computers. The user device(s) 102 may also include any computing devices having other form factors, e.g., computing devices included in vehicles, gaming devices, televisions, or other appliances (e.g., networked home automation devices and home appliances). The user device(s) 102 may use a variety of different operating systems or platforms. In instances where a user device 102 is a mobile device, the device 102 may operate using an OS such as ANDROID® by Google Inc., IOS® by Apple Inc., or WINDOWS PHONE® by Microsoft Corporation. In instances where the user device 102 is a laptop or desktop computing device, the device 102 may use an OS such as MICROSOFT WINDOWS® by Microsoft Corporation, MAC OS® by Apple Inc., or LINUX® (LINUX is the registered trademark of Linus Torvalds in the U.S. and other countries). The user device(s) 102 may interact with the search system 100 and/or the app state determination system 108 using operating systems other than those described herein, whether presently available or developed in the future.

The user device(s) 102 can communicate with the search system 100 (and, e.g., the app state determination system 108) via the network 106. In general, the user device(s) 102 may communicate with any of the systems 100, 108 using any app that can transmit search queries and, e.g., indications of current app states, to the systems 100, 108 and receive search results from the search system 100. In some examples, the user device(s) 102 may include an app that is dedicated to interfacing with one or more of the systems 100, 108, such as an app dedicated to searches (e.g., a search app). In other examples, the user device(s) 102 may communicate with any of the systems 100, 108 using a more general app, such as a web browser app. An app included on a user device 102 to communicate with any of the systems 100, 108 may include a GUI with a search field, or "box," into which users may enter search queries, e.g., using a touchscreen, physical keyboard, a speech-to-text program, or other form of user input available on the device 102. In some examples, the app may also be configured to determine (e.g., via a current app state determination module) current app states of native apps executing on the user device 102 and transmit indications of the states to one or more of the systems 100, 108.

The user device 102 may use a GUI of a search app, or a more general app, included on the device 102 to display search results to the user. The user device 102 may also use the GUI to receive search queries from the user and transmit the queries and, e.g., indications of current app states, to the search system 100 (and, e.g., the app state determination system 108). The GUI may display the search results to the user in a variety of different ways, depending on the information transmitted to the user device 102 from the search system 100. In examples where the search results include one or more AMs, the search system 100 may transmit the AMs to the user device 102 with result scores, link data, and/or other information (e.g., indications of user interaction distances) used to generate and display (e.g., rank) one or more user selectable links for the AMs. In some examples, the GUI may display the search results to the user as a list of the user selectable links, including text and/or image data. For example, the text and/or images data may include names of apps referenced by the AMs, descriptions of the AMs and/or operations indicated therein, and images associated with the apps, or app states thereof, specified by the AMs (e.g., app, or app state icons or "screens"). In some examples, the GUI may display the search results as the list of the user selectable links arranged under a search field into which the user has entered a search query. The GUI may arrange the user selectable links by result scores associated with the links, i.e., with the AMs for which the links are generated, or using other logic (e.g., based on user interaction distance). In some examples, the GUI may also group the user selectable links by the associated native apps (e.g., using native app headers).

The data source(s) 104 may be sources of data that the search system 100 may use to generate and/or update the search data store 112. For example, the search system 100 may use the data source(s) 104 to generate and/or update one or more databases, indices, tables, files, or other data structures included in the search data store 112. The search system 100 may generate new app state records and update existing app state records based on data retrieved from the data source(s) 104. For example, the search system 100 may include modules that generate new app state records and/or update existing app state records based on the data retrieved from the data source(s) 104. In some examples, some or all of the data included in the search data store 112 (e.g., one or more app state records) may be manually generated by a human operator.

The data source(s) 104 may include a variety of different data providers. For example, the data source(s) 104 may include data from app developers, such as app developer websites and data feeds provided by app developers. The data source(s) 104 may also include operators of digital distribution platforms configured to distribute apps to user devices 102. The data source(s) 104 may further include other websites, such as websites that include web logs (i.e., blogs), app reviews, or other data related to apps. Additionally, the data source(s) 104 may include social networking sites, such as "FACEBOOK®" by Facebook Inc. (e.g., Facebook posts) and "TWITTER®" by Twitter Inc. (e.g., text from tweets). The data source(s) 104 may also include online databases that include data related to movies, television programs, music, and restaurants. The data source(s) 104 may further include other types of data sources, which may have various types of content and update rates.

In some examples, the search system 100 may retrieve data from the data source(s) 104, including any type of data related to native app functionality and/or native app states. The search system 100 may then generate one or more app state records based on the data and store the records in the search data store 112. In other examples, some or all of the data included in the app state records (e.g., ASI) may be manually generated by a human operator. Additionally, in some examples, the data included in the app state records may be updated over time so that the search system 100 may provide up-to-date search results in response to user-specified search queries and, e.g., indications of current app states, received from the user device(s) 102.

Figure 2:
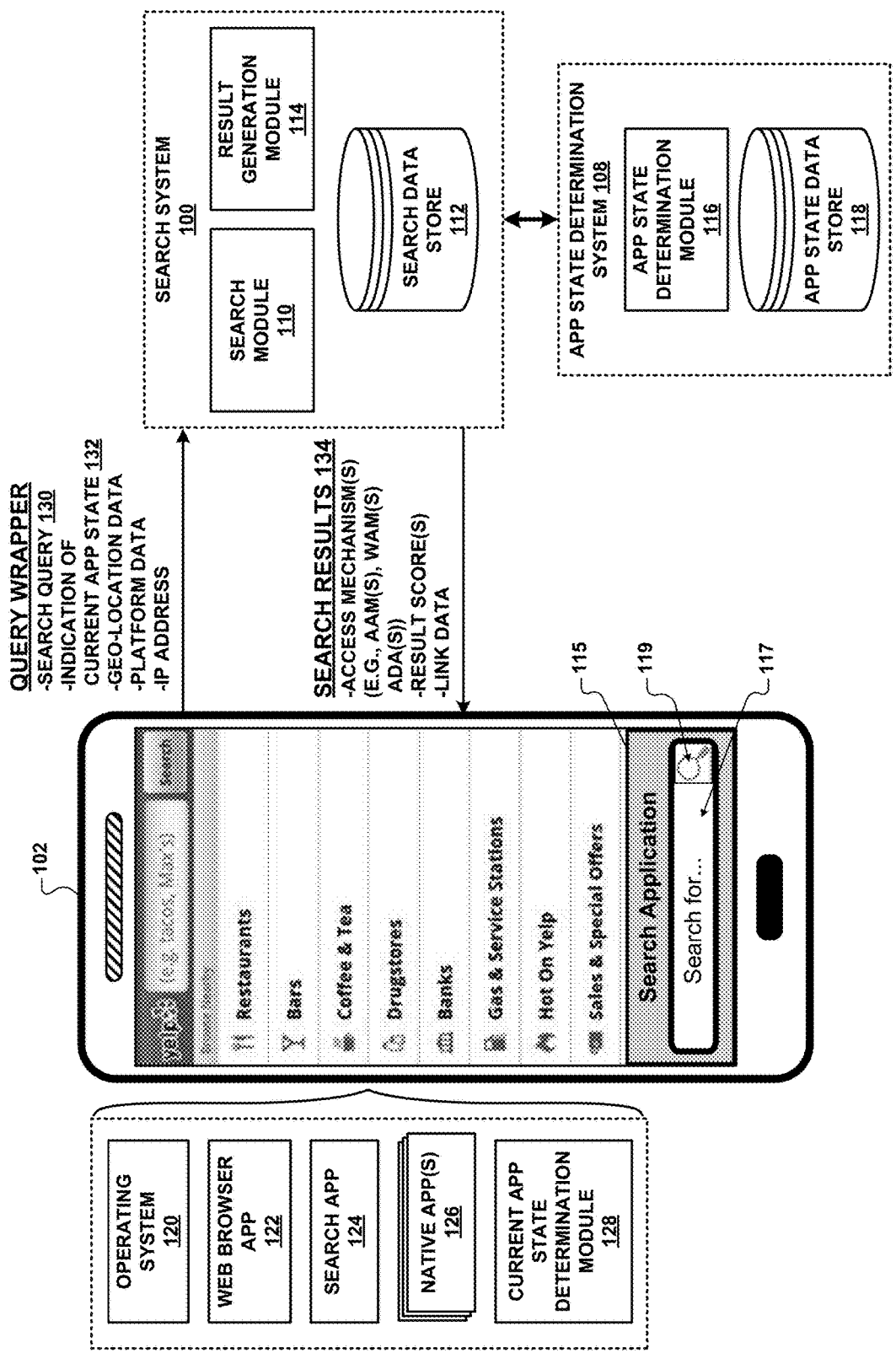
FIG. 2 illustrates an example user device in communication with an example search system and an example app state determination system.

FIG. 2 illustrates an example of one of the user device(s) 102 in communication with the search system 100 and app state determination system 108. Specifically, FIG. 2 depicts example interactions and data exchanged among the user device 102, search system 100, and app state determination system 108. As shown in FIG. 2, the user device 102 may transmit a query wrapper to the search system 100. The query wrapper may include a search query 130 (a text string), an indication of a current app state 132 of a native app (e.g., any of one or more native apps included on the user device 102) executing on the device 102, geo-location data, platform data, and/or other data (e.g., an IP address) associated with a user of the device 102, the device 102, and/or the query 130. For example, the user may have entered the search query 130 into a search field 117 of a GUI 115 of a search app 124 included on the user device 102. The user may have then submitted the search query 130 to the search system 100 (e.g., as part of the query wrapper) by selecting a search button 119 of the GUI 115. In this example, the user device 102 (e.g., the search app 124) may have determined the current app state of the native app executing on the device 102 and submitted the indication of the state 132 to the search system 100 (e.g., also as part of the query wrapper). For example, the user device 102 may have determined the current app state using a current app state determination module 128 included on the device 102 (e.g., as part of the search app 124). In some examples, the user device 102 may have determined the current app state prior to, during (e.g., in response to), or following the user entering and/or submitting the search query 130 as described herein. Upon receiving the query wrapper from the user device 102, the search system 100, e.g., using the app state determination system 108, may generate one or more search results 134 based on the search query 130 and the indication 132 included in the wrapper. As described herein, to generate the search results 134, the search system 100 may identify one or more app state records included in the search data store 112 using the search query 130 and the indication 132. The search system 100 may then transmit the search results 134 to the user device 102. As shown in FIG. 2, the search results 134 may include one or more AMs (e.g., AAMs, WAMs, and/or ADAs), result scores, link data, and/or other information (e.g., indications of user interaction distances associated with the AMs).

In the example of FIG. 2, upon receiving the search results 134 from the search system 100, the user device 102 may display the results 134 as one or more user selectable links.

For example, the user device 102 may generate the user selectable links such that each link is associated with (e.g., includes) one or more of the AMs included in the search results 134. As described herein, each AM included in the search results 134 may specify a state of a native app (e.g., as in the case of an AAM), a state of a web-based app (e.g., as in the case of a WAM), or a location from which a native app may be downloaded (e.g., as in the case of an ADA). As a result, when the user of the user device 102 selects (e.g., touches, or clicks on) each user selectable link, the device 102 may launch the corresponding app (e.g., one of the native app(s) 126, or a web browser app 122 also included on the device 102) and set the app into an app state (e.g., a native app screen or GUI, or a web page) specified by the AM. Additionally, or alternatively, upon the user selecting the user selectable link, the user device 102 may download the corresponding native app from a location specified by the AM and install the app. The user device 102 may generate the user selectable links using the link data also included in the search results 134. For example, the link data may include any of text (e.g., describing a name of an app and/or an app state) and image data (e.g., an icon for the app, or app state). In this manner, the link data included in (e.g., used to generate) each user selectable link may describe the app and/or app state associated with the link. The user device 102 may further arrange (e.g., order, or rank) the user selectable links to display the links to the user based on the result scores also included in the search results 134. For example, the user device 102 may assign each user selectable link the result score associated with the app state record from which the one or more AMs included in the link were selected. The user device 102 may then order the user selectable links based on the result scores (e.g., display higher-ranking links higher in a list of user selectable links). Example search results 134 displayed to a user of a user device 102 as user selectable links are described with reference to FIGS. 12A-15C.

Figure 3A:
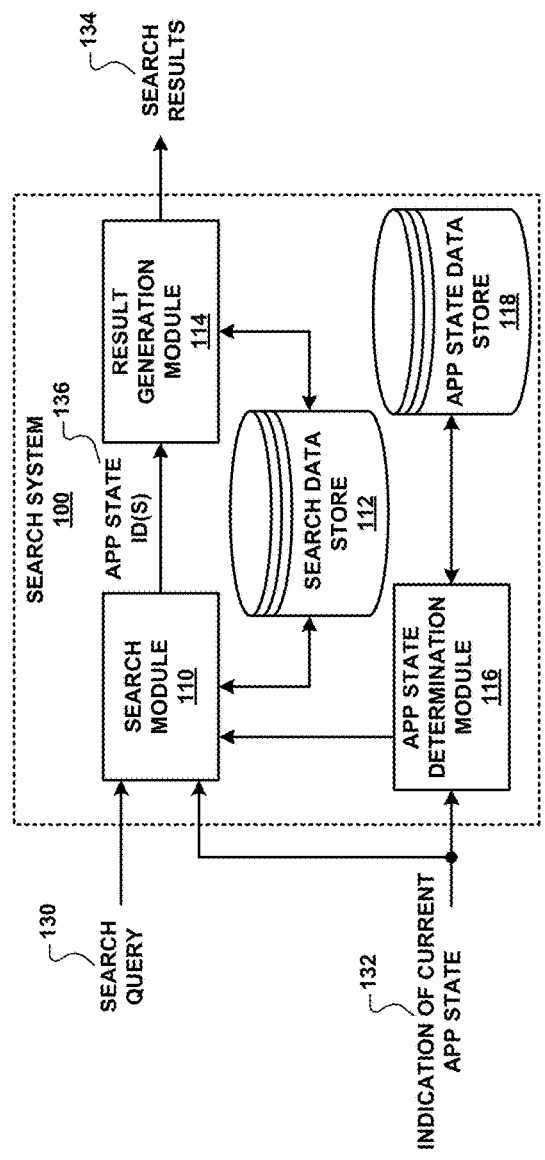
FIG. 3A is a functional block diagram of an example search system.

FIG. 3A illustrates an example search system 100. As described herein, the search system 100 generates search results 134 based on a search query 130 and, e.g., an indication of a current app state 132, received from one of the user device(s) 102, as well as using data included in the search data store 112. Specifically, the search module 110 identifies one or more app state records included in the search data store 112 based on the search query 130 and, e.g., based on the indication 132. In some examples, the search module 110 may identify the app state records based on the indication 132 using the app state determination system 108, as described herein. The search module 110 then transmits one or more app state IDs 136 that identify the identified app state records to the result generation module 114. The result generation module 114 receives the app state IDs 136 from the search module 110, identifies the app state records in the search data store 112 using the IDs 136, and selects one or more AMs (e.g., AAMs, WAMs, and/or ADAs) from the identified records. The result generation module 114 then transmits the selected AMs to the user device 102 as the search results 134 (e.g., with result scores, link data, and/or other information, such as indications of user interaction distances).

In some examples, as shown in FIG. 3A, the search module 110 receives the indication of the current app state 132 from the user device 102 and identifies the app state records based on the indication 132. In other examples, the app state determination module 116 and/or the app state data store 118 may perform some or all of the functions associated with receiving the indication 132 and identifying the app state records based on the indication 132. As one example, as also shown in FIG. 3A, the search module 110 may receive the indication 132 directly from the user device 102. In this example, each app state record included in the search data store 112 may indicate one or more parent app states associated with the app state specified by the record, as described herein (e.g., as shown in FIG. 5A). The search module 110 may then identify the app state records based on one or more matches between the indication 132 and the parent app states indicated by the identified records. In this example, the app state determination module 116 (e.g., using information included in the app state data store 118) may initially process (e.g., translate) the indication 132 such that the search module 110 is able to identify the app state records in the manner described herein. As another example, as also shown in FIG. 3A, the app state determination module 116 may receive the indication 132 from the user device 102 and determine one or more child app states for which the current app state, as specified by the indication 132, is a parent app state, as also described herein. For example, to make this determination, the app state determination module 116 may use the indication 132 and information included in the app state data store 118. The app state determination module 116 may then transmit an indication of the determined child app states to the search module 110, as further shown in FIG. 3A. Using the indication of the determined child app states, the search module 110 may identify the app state records such that each identified record specifies one of the states. The app state determination module 116 may also store the indications of the determined child app states in the app state data store 118, e.g., for later retrieval.

Figure 3B:
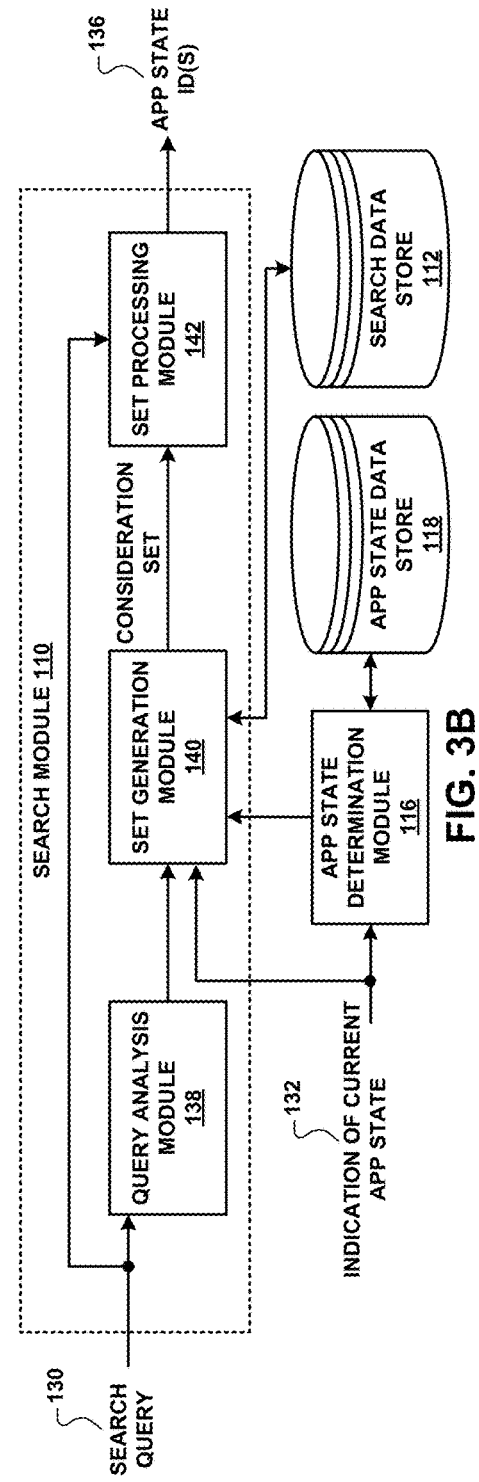
FIG. 3B is a functional block diagram of an example search module.

FIG. 3B illustrates an example search module 110. FIG. 3B also depicts an example search data store 112, app state determination module 116, and app state data store 118. The search module 110 of FIG. 3B includes a query analysis module 138, a consideration set generation module (hereinafter, "set generation module") 140, and a consideration set processing module (hereinafter, "set processing module") 142. The query analysis module 138 receives a search query 130 from one of the user device(s) 102 (e.g., as part of a query wrapper) and analyzes the query 130 (e.g., performs any of tokenization, filtering, stemming, synonymization, and stop word removal with respect to the query 130). The set generation module 140 identifies one or more app state records included in the search data store 112 based on the (e.g., analyzed) search query 130 and, e.g., based on an indication of a current app state 132 also received from the user device 102 (e.g., as part of the query wrapper). As shown in FIG. 3B, the set generation module 140 may receive the indication 132 via the app state determination module 116. As a specific example, the set generation module 140 may identify the app state records using the search query 130 and, e.g., the indication 132, as inputs to Lucene® information retrieval software developed by the Apache Software Foundation. For example, the set generation module 140 may identify the app state records based on one or more (e.g., text) matches between one or more terms of the search query 130 and one or more terms of information (e.g., ASI and/or app state IDs) included in the records. In some examples, the set generation module 140 may further identify the app state records based on (e.g., text) matches between the indication 132 and information (e.g., indications of parent app states) included in the records. Specifically, the set generation module 140 may, for each identified app state record, determine that the record indicates the current app state, as specified by the indication 132, as a parent app state. In other examples, the set generation module 140 may identify the app state records based on (e.g., text) matches between information (e.g., an indication of determined child app states of the current app state) generated using the indication 132 and information (e.g., app state IDs) included in the records. In particular, the app state determination module 116 (e.g., using information stored in the app state data store 118) may initially determine one or more child app states for which the current app state, as specified by the indication 132, is a parent app state. For example, the app state determination module 116 may determine the child app states by traversing an app state graph, or another representation of an app state hierarchy, that indicates the current app state and the child app states. The app state determination module 116 may then transmit an indication of the determined child app states (e.g., app state IDs of app state records that specify the states) to the set generation module 140. The set generation module 140 may, for each identified app state record, determine that the record specifies one of the child app states (e.g., includes one of the app state IDs). The identified app state records may be referred to herein as a "consideration set." The set processing module 142 may process (e.g., score and select a subset of) the consideration set, select one or more app state IDs 136 that identify one or more of the app state records included in the set, and transmit the IDs 136 to the result generation module 114.

The information conveyed by the search results 134 may depend on how the set processing module 142 generates the result scores for the app state records of the consideration set. For example, for each app state record, the corresponding result score may be generated based on various features associated with the record, such as relevance of the app state of the native app specified by the record to the search query 130, popularity of the state, and/or other properties of the state, depending on the one or more parameters the set processing module 142 uses to score the app state records. The set processing module 142 may generate the result scores for the app state records in a variety of different ways. In some examples, the set processing module 142 generates a result score for an app state record based on one or more scoring features. The scoring features may be associated with the app state record, the search query 130, and/or other data. An app state record scoring feature (hereinafter, "record scoring feature") may be based on any data associated with an app state record. For example, a record scoring feature may be based on any data included in ASI of an app state record. An example record scoring feature may be a popularity score (e.g., based on user ratings of a native app or a state of the app) associated with an app state record. A query scoring feature may include any data associated with the search query 130. For example, a query scoring feature may include any of a number of words in the search query 130, popularity of the query 130, and an expected frequency of the words in the query 130. A record-query scoring feature may include any data generated based on information associated with both an app state record and a search query 130 that resulted in identification of the record by the set generation module 140. For example, a record-query scoring feature may include any parameters that indicate how well terms of a search query 130 match terms of ASI (and/or an app state ID) of an app state record identified using the query 130. In some examples, as described herein, the set processing module 142 may generate a result score for an app state record based on a user interaction distance associated with the app state specified by the record. In these examples, a "user interaction distance" scoring feature may be an indication of a number of user interactions (e.g., user inputs) required to reach the corresponding app state from the current app state in the associated native app. User interaction distances associated with app states are described with reference to FIG. 6A. In general, the set processing module 142 may generate a result score for an app state record using the record, query, record-query, user interaction distance, and/or any other scoring features.

In some examples, to generate the result scores for the app state records of the consideration set, the set processing module 142 may include one or more machine-learned models (e.g., a supervised learning model including regression) configured to receive one or more of the record, query, record-query, and/or user interaction distance scoring features. For example, the set processing module 142 may pair the search query 130 with each app state record and calculate a vector of features for each (query, record) pair. The vector of features may include one or more record, query, record-query, and/or user interaction distance scoring features. The set processing module 142 may then input the vector of features into a machine-learned relevance (MLR) model to calculate a result score for the app state record (e.g., simultaneously based on the features). In some examples, the MLR model may include a set of (e.g., gradient-boosted) decision trees. In other examples, the MLR model may be trained by a simple form of logistic regression. In still other examples, the machine-learned task described herein can be framed as a semi-supervised learning task, where a minority of training data is labeled with human-curated result scores and the rest of the data is used without such labels.

As described herein, the result scores associated with the app state records (e.g., the AMs included therein) may be used in various different ways. In some examples, the result scores may be used to rank (e.g., order) the AMs in a list. In these examples, a higher result score may indicate that the corresponding AM (e.g., an AAM specifying a state of a native app) is more relevant to the user than an AM (e.g., an AAM specifying a state of another native app) having a smaller result score. In examples where the search results 134 are displayed as a list of user selectable links on the user device 102, the links including AMs associated with larger result scores may be listed closer to the top of the list (e.g., near the top of the screen). In these examples, links including AMs having lower result scores may be located farther down the list (e.g., off screen) and may be accessed by scrolling down the screen of the user device 102.

FIGS. 4A-4B illustrate example app state determination systems 108. The app state determination systems 108 of FIGS. 4A-4B each receive an indication of a current app state 132 from one of the user device(s) 102 and transmit any of a variety of types of information to the search system 100 (e.g., the set generation module 140) in response to receiving the indication 132. As one example, as shown in FIG. 4A, the app state determination system 108 may receive the indication 132 from the user device 102, process the indication 132, and transmit the processed indication 144 to the search system 100. The search system 100 (e.g., the set generation module 140) may identify one or more app state records included in the search data store 112 that indicate the current app state, as specified by the processed indication 144, as a parent app state. In a specific example, the app state determination module 116 may be configured to format (e.g., translate) the indication of the current app state 132 (e.g., using information included in the app state data store 118) such that the search system 100 is able to match the indication 132 with (e.g., map the indication 132 to) one or more parent app states indicated by the identified app state records. As another example, as shown in FIG. 4B, the app state determination system 108 may receive the indication of the current app state 132 from the user device 102 and determine one or more child app states for which the current app state, as specified by the indication 132, is a parent app state. For example, the app state determination module 116 may be configured to determine the child app states using the indication 132 and an indication of app state hierarchy 146 (e.g., an app state graph, or another representation) for the native app associated with the current app state (e.g., included in the app state data store 118). The app state determination system 108 may then transmit an indication of (e.g., one or more app state IDs of one or more app state records that specify) the determined child app states 148 to the search system 100. The search system 100 (e.g., the set generation module 140) may identify one or more app state records included in the search data store 112 that specify the determined child app states using (e.g., that include the app state IDs specified by) the indication 148.

In some examples, the app state determination system 108 may receive the indication of the current app state 132 from the user device 102 and forward the indication 132 to the search system 100 (e.g., the set generation module 140) without modifying or generating data based on the indication 132. In other examples, the search system 100 may receive the indication 132 from the user device 102 and identify one or more app state records included in the search data store 112 based on the indication 132 without using the app state determination system 108.

Figure 5B:
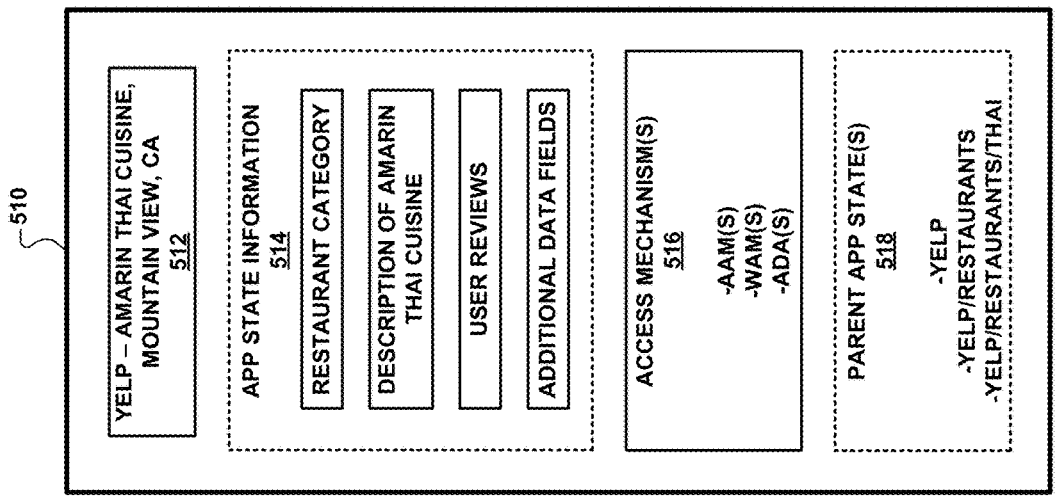
FIGS. 5A-5B illustrate example app state records.
Figure 5A:
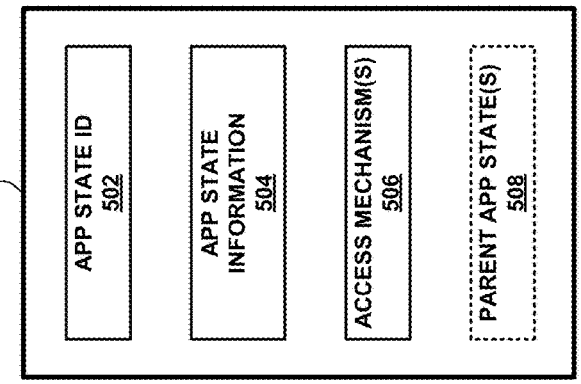

FIGS. 5A-5B illustrate example app state records that may be included in the search data store 112. FIG. 5A illustrates a general example of an app state record 500. The app state record 500 of FIG. 5A includes information related to (e.g., specifying) an app state of a native app. As shown in FIG. 5A, the app state record 500 includes an app state ID 502 that uniquely identifies the record 500 among other app state records included in the search data store 112. As further shown, the app state record 500 includes ASI (e.g., text) 504 that describes the app state specified by the record 500. As also shown, the app state record 500 includes one or more AMs (e.g., AAMs, WAMs, and/or ADAs) 506 that enable a user device 102 to access the app state specified by the record 500. As shown in FIG. 5A, the app state record 500 may also indicate one or more other app states that are associated with the app state specified by the record 500. For example, these additional app states may correspond to one or more parent app states 508 of the app state specified by the record 500. In other words, the additional app states may be higher in an app state hierarchy, or "shallower," than the app state specified by the record 500. In some examples, the parent app state(s) 508 may be specified by one or more other app state records also included in the search data store 112. In these examples, the app state record 500 of FIG. 5A may indicate the parent app state(s) 508 using app state IDs of the other app state records.

In some examples, the app state record 500 of FIG. 5A may also include information that describes values of one or more metrics associated with a person, place, or thing described in the record 500. Example metrics include popularity of a place described in the app state record 500 and/or ratings (e.g., user ratings) of the place. For example, if the app state record 500 describes a song, a metric associated with the song may be based on popularity of the song and/or ratings (e.g., user ratings) of the song. The information included in the app state record 500 may also be based on measurements associated with the record 500, such as how often the record 500 is retrieved during a search and how often user selectable links for the AM(s) 506 of the record 500 are selected by a user. The information may also indicate whether the app state record 500 includes an AAM for a default app state, or a deeper app state, of a native app.

FIG. 5B illustrates a specific example of an app state record 510 that specifies an app state of a native app "Yelp®" by Yelp Inc. (hereinafter, "Yelp"). The app state specified by the app state record 510 of FIG. 5B corresponds to an entry in Yelp for a particular "Amarin Thai Cuisine" restaurant located in Mountain View, Calif. As shown in FIG. 5B, the app state record 510 includes an app state ID "Yelp—Amarin Thai Cuisine, Mountain View, Calif." 512 that uniquely identifies the record 510 among other app state records included in the search data store 112. In other examples, the app state ID 512 may be a numeric value, or have another (e.g., machine-readable) representation. As further shown, the app state record 510 includes ASI 514 that describes the app state specified by the record 510, and which may be used to identify the record 510 in the search data store 112. For example, as described herein, the search system 100 may identify the app state record 510 in the search data store 112 based on matches between terms of a search query 130 received from a user device 102 and terms of the ASI 514 included in the record 510. The ASI 514 describes a restaurant category, a description, user reviews, and/or any other information related to the Amarin Thai Cuisine restaurant associated with the app state specified by the app state record 510. In some examples, the ASI 514 may also describe one or more functions provided by the app state, such as, e.g., "make a restaurant reservation," "read user reviews," and "write a user review." As also shown, the app state record 510 includes one or more AMs (e.g., AAMs, WAMs, and/or ADAs) 516 that enable a user device 102 to access the app state specified by the record 510.

Figures 6A, 6B:
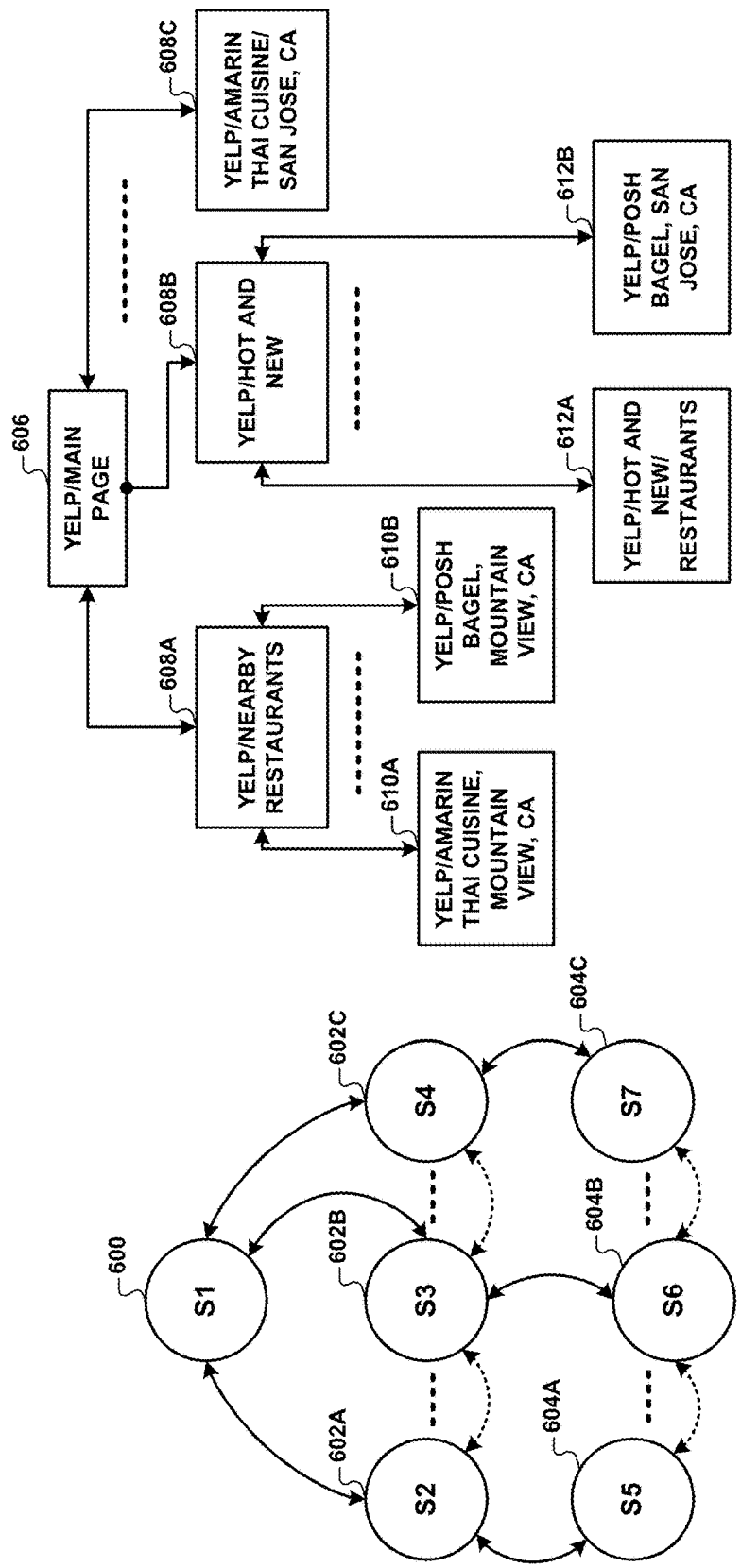
FIGS. 6A-6B illustrate example representations of app state hierarchies.

The app state record 510 of FIG. 5B also indicates one or more parent app states 518 of the app state specified by the record 510, which may also be used to identify the record 510 in the search data store 112. For example, as described herein, the search system 100 may identify the app state record 510 in the search data store 112 based on matches between an indication of a current app state 132 received from a user device 102 and one or more of the parent app state(s) 518 indicated in the record 510. In some examples, the app state record 510 may not indicate parent app states of the app state specified by the record 510. In these examples, as also described herein, the app state determination system 108 may initially determine one or more child app states for which the current app state, as specified by the indication 132, is a parent app state. For example, the app state determination system 108 may determine the child app states using an app state graph, or another representation of an app state hierarchy for a native app that includes the current app state and the child app states (e.g., as shown in FIG. 6A). The search system 100 may then identify the app state record 510 of FIG. 5B in the search data store 112 by determining that the record 510 specifies one of the determined child app states.

In some examples, the app states indicated by the app state graph or other representation of the app state hierarchy may correspond to one or more app state records included in the search data store 112. In other words, the app state graph or other app state hierarchy representation may be a data structure that describes a hierarchical relationship of the app states specified by the app state records. In these examples, the determined child app states may be represented using one or more app state IDs of the corresponding app state records included in the search data store 112. Also in these examples, the search system 100 may identify the app state record 510 of FIG. 5B by determining that the app state ID 512 of the record 510 matches an app state ID used to represent one of the determined child app states.

As described herein, each native app may include one or more app states that may be ordered according to an app state hierarchy. In some examples, the app state hierarchy may have a tree-like structure, where a main page, or screen, of the native app constitutes the highest (or shallowest) app state, and one or more app states that are forward-reachable from the main page constitute lower (or deeper) app states. Representations of app states of a native app arranged in such a hierarchical manner may be referred to herein as an "app state graph," as described with reference to FIG. 6A. In other examples, multiple app states of a native app may be grouped by a common function associated with each state. As one example, multiple app states of a native business (e.g., restaurant) review app (e.g., Yelp) that each describe one or more reviews for a business may be grouped into a function called "show business reviews." As another example, multiple app states of a native movie database app (e.g., IMDb) that each show actor or movie information may be grouped into functions called "show actor information" or "show movie information." Representations of app states of a native app grouped by function in this manner may be referred to herein as a "function graph."

According to the techniques described herein, the search system 100 (e.g., using the app state determination system 108) may use an indication of a current app state 132 in conjunction with any of app state graphs, function graphs, or other representations of (e.g., hierarchical relationships of) app states of native apps, to determine one or more child app states for which the current app state is a parent app state. In some examples, to determine the child app states, the search system 100 may traverse an app state graph, a function graph, or an equivalent data structure, upon receiving the indication 132. In other examples, the search system 100 may use the app state graph, function graph, or another data structure, to determine app state relationships prior to receiving the indication 132 (e.g., store the determined relationships as indications of parent app states in app state records). Using the indication 132 and app state graphs or similar data structures, the search system 100 may identify one or more app states that are lower (or deeper) in an app state hierarchy compared to the current app state.

FIGS. 6A-6B illustrate example representations of hierarchies of app states (e.g., app state hierarchies) of native apps. FIG. 6A depicts an example representation of an app state hierarchy of an app (e.g., any of the native app(s) 126). The representation shown in FIG. 6A may be referred to herein as an "app state graph." The app state graph of FIG. 6A indicates a single main app state (S1) 600, multiple intermediate app states (S2, S3, S4) 602A-602C, and multiple end app states (S5, S6, S7) 604A-604C. As indicated by the dashed lines in FIG. 6A, in some examples, the app state graph may include one or more additional intermediate app states and/or end app states. The main app state (S1) 600 of the app state graph of FIG. 6A may correspond to a home page of the native app associated with the graph. The intermediate app states (S2, S3, S4) 602A-602C may correspond to one or more app states of the native app that are forward-reachable from the main app state (S1) 600, as described herein, and include one or more app states that are also forward-reachable from the states (S2, S3, S4) 602A-602C themselves. For example, the intermediate app states (S2, S3, S4) 602A-602C may correspond to one or more pages of the native app that reference (e.g., indicate directly, or by category) one or more other pages of the app (e.g., one or more end app states). The end app states (S5, S6, S7) 604A-604C may, in turn, correspond to one or more app states of the native app that are forward-reachable from one or more intermediate app states (e.g., S2, S3, S4 602A-602C), but which do not include any app states that are forward-reachable from the states (S5, S6, S7) 604A-604C themselves. Additionally, as also shown in FIG. 6A, the main app state (S1) 600 may be backward-reachable from the intermediate app states (S2, S3, S4) 602A-602C, which may themselves be backward-reachable from the end app states (S5, S6, S7) 604A-604C. As further shown, in some examples, some or all of the intermediate app states (S2, S3, S4) 602A-602C may be laterally-reachable from one or more other ones of the intermediate app states (S2, S3, S4) 602A-602C, and some or all of the end app states (S5, S6, S6) 604A-604C may be laterally-reachable from one or more other ones of the end app states (S5, S6, S7) 604A-604C.

As described herein, the search system 100 may receive an indication of a current app state 132 of a native app executing on one of the user device(s) 102 from the device 102. The search system 100 (e.g., the app state determination system 108) may then determine one or more app states for which the current app state, as specified by the indication 132, is a parent app state. The determined app states may be referred to herein as "child" app states of the current (e.g., parent) app state. For example, with reference to the app state graph of FIG. 6A, the search system 100 (e.g., the app state determination system 108) may initially identify the current app state in the app state graph using (e.g., textual, numerical, and/or machine-readable data, such as an app state ID, included in) the indication 132. In some examples, the search system 100 may first determine the current app state based on (e.g., an AAM or one or more operations included in) the indication 132, as described herein. The search system 100 (e.g., the app state determination system 108) may then identify one or more app states in the app state graph that are forward-reachable from the current app state as the child app states of the current app state. For example, the search system 100 may identify one or more app states that are lower in the app state graph than the current app state as the child app states. In this example, the search system 100 may exclude from the child app states any app states that are backward-reachable, or laterally-reachable, from the current app state in the app state graph. Upon identifying the child app states, the search system 100 (e.g., the set generation module 140) may identify one or more app state records included in the search data store 112 that specify one or more of the child app states, as described herein. The search system 100 (e.g., the result generation module 114) may then generate one or more search results 134 that include information (e.g., one or more AMs, result scores, and link data) included in the identified app state records and transmit the results 134 to the user device 102, as also described herein. In some examples, e.g., using the app state graph, the search system 100 (e.g., the app state determination system 108) may also determine one or more user interaction distances associated with the determined child app states (e.g., the numbers of user interactions in the corresponding native app needed to reach each child app state from the current app state) and transmit indications of the user interaction distances to the user device 102 (e.g., as part of the search results 134). As described herein, the user device 102 may use the user interaction distances to display (e.g., rank) the search results 134.

FIG. 6B depicts a specific example of an app state graph associated with Yelp. The app state graph of FIG. 6B includes a representation of a main app state 606 of Yelp, which may correspond to a home page of Yelp. The app state graph also includes representations of intermediate app states 608A-608C of Yelp. As shown in FIG. 6B, the intermediate app states 608A-608C correspond to pages in Yelp that reference (e.g., indicate directly, or by category) other pages in Yelp, namely pages associated with entries in Yelp for nearby (e.g., relative to a geographical location of a user device 102) and popular (e.g., "hot and new") restaurants. The app state graph also includes representations of end app states 610A-610B and 612A-612B of Yelp. As shown in FIG. 6B, the end app states 610A-612B correspond to pages in Yelp that are associated with entries in Yelp for specific restaurants, such as Amarin Thai Cuisine and Posh Bagel located in Mountain View and San Jose, Calif. As further shown, each intermediate app state 608A-608C is forward-reachable from the main app state 606 and includes one or more app states that are also forward-reachable from the state itself. As also shown, each end app state 610A-612B is forward-reachable from one of the intermediate app states 608A-608C, but does not include any app states that are forward-reachable from the state itself. As shown in FIG. 6B, the main app state 606 may be backward-reachable from the intermediate app states 608A-608C, which may themselves be backward-reachable from the end app states 610A-612B. In some examples (not shown), some or all of the intermediate app states 608A-608C may be laterally-reachable from one or more other ones of the intermediate app states 608A-608C. In other examples (also not shown), some or all of the end app states 610A-612B may be laterally-reachable from one or more other ones of the end app states 610A-612B.

In additional examples, the techniques of the present disclosure may make use of representations of app state hierarchies that are different from the ones described herein. In some examples, the techniques may use representations that indicate app states of native apps using textual, rather than graphical (e.g., graph) forms (e.g., URLs). In other examples, as described herein, the techniques may use textual and/or graphical representations that indicate app states of native apps that are grouped by associated functions (e.g., "function graphs"). In still other examples, the techniques may use representations that indicate app states of native apps and their hierarchical relationships in machine-readable (e.g., binary) form, rather than human-readable (e.g., textual and/or graphical) form as described herein.

Figure 7A:
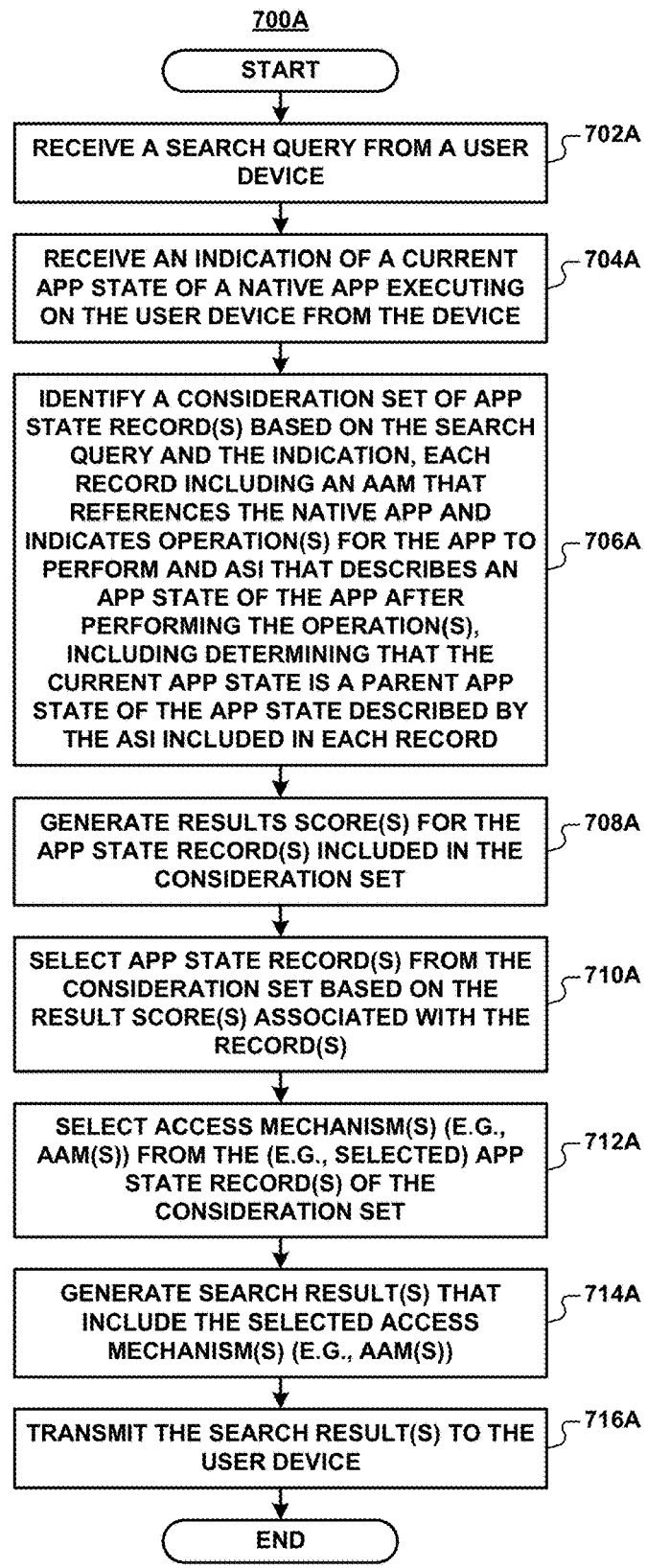
FIGS. 7A-7C are flow diagrams that illustrate example methods for generating search results using a search query and an indication of a current app state at a search system.
Figure 7C:
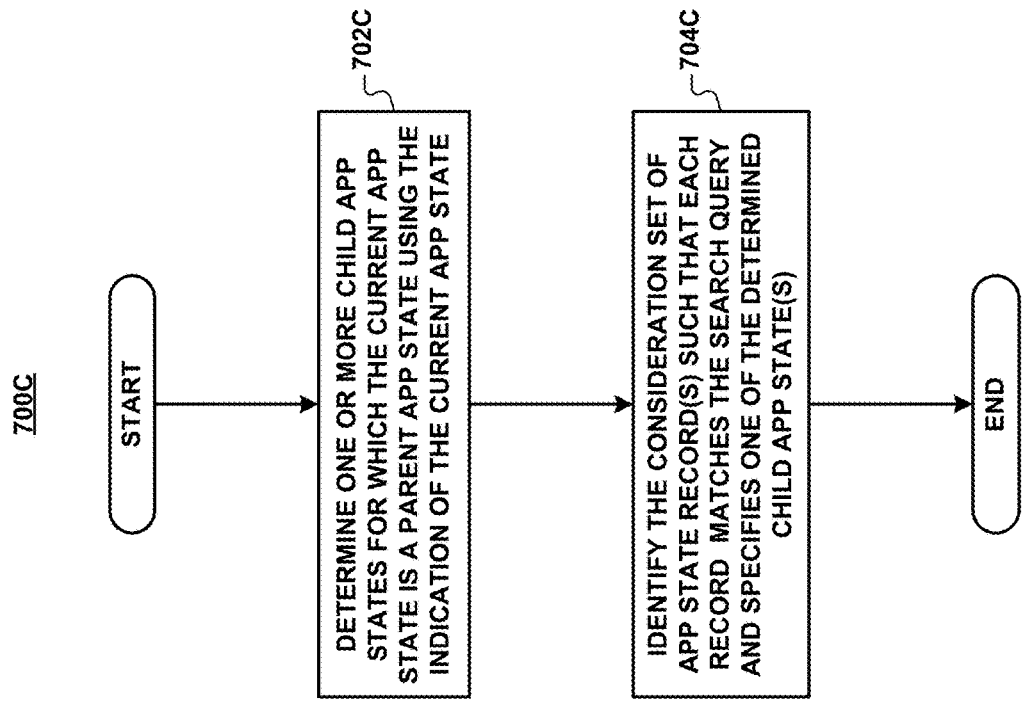
Figure 7B:
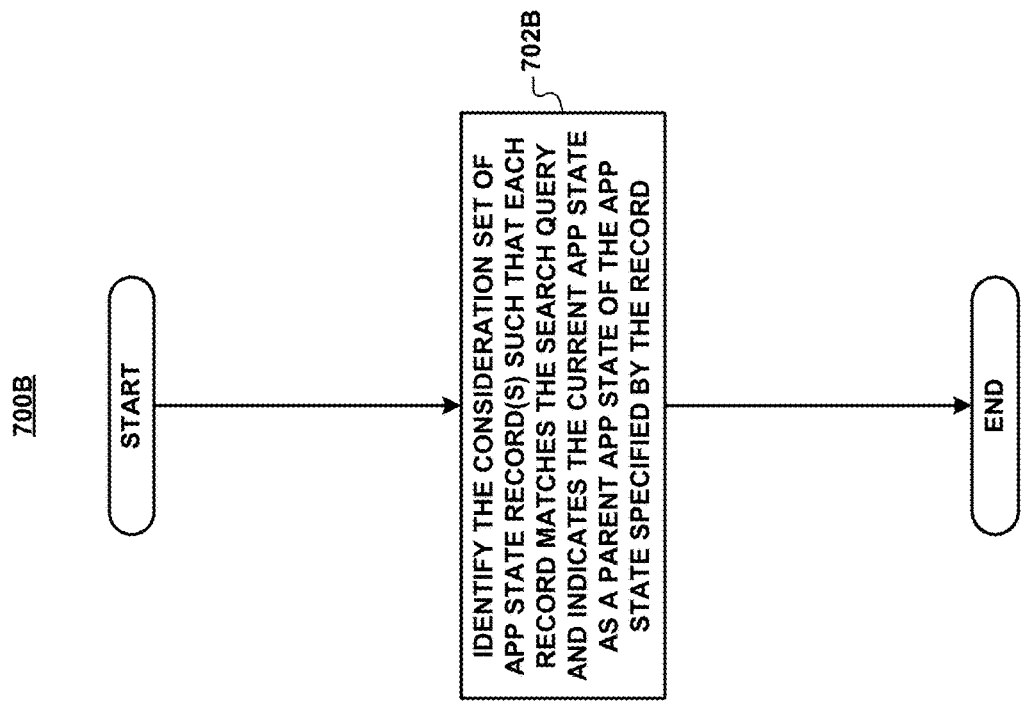

FIGS. 7A-7C are flow diagrams that illustrate example methods 700A-700C, respectively, for generating search results 134 at a search system 100 based on a search query 130 and an indication of a current app state 132 received from a user device 102. Specifically, FIG. 7A illustrates an example method 700A for generating the search results 134, while FIGS. 7B-7C illustrate examples of one or more particular aspects of the method 700A.

With reference to FIG. 7A, in block 702A, the search system 100 may initially receive a search query 130 specified by a user from a user device 102 (e.g., as part of a query wrapper). In some examples, the search system 100 (e.g., the query analysis module 138) may perform an analysis of the search query 130 (e.g., perform any of tokenization, filtering, stemming, synonymization, and stop word removal with respect to the query 130). In block 704A, the search system 100 may also receive an indication of a current app state 132 from the user device 102 (e.g., also as part of the query wrapper, or separately from the search query 130). As described herein, the indication 132 may specify a current app state of a native app (e.g., any of the native app(s) 126) executing on the user device 102. For example, the search system 100 may determine the current app state using any of textual, numerical, and/or machine-readable data, one or more AAMs, and/or one or more operations included in, or referenced by, the indication 132. In some examples, the search system 100 may determine the current app state using the indication 132 in conjunction with a version of the native app associated with the current app state. In other examples, the search system 100 may receive additional information from the user device 102 (e.g., as part of the query wrapper, or separately), such as user information and/or geo-location, platform, and IP address information associated with the user device 102. In block 706A, the search system 100 (e.g., the set generation module 140) may identify a consideration set of one or more app state records included in the search data store 112 based on the (e.g., analyzed) search query 130 and based on the indication of the current app state 132. As described herein, each identified app state record may specify an app state of a native app. In particular, each identified app state record may include an AAM that references a native app and indicates one or more operations for the app to perform, and ASI that describes an app state of the app after the app has performed the operations. In this example, the search system 100 may identify the app state records such that each record specifies an app state of the native app executing on the user device 102 (e.g., the record includes an AAM that references the app) that is also forward-reachable from the current app state of the app (e.g., by determining that the current app state is a parent app state of the state described by the ASI included in the record). For example, the search system 100 may identify the app state records based on matches between terms of the search query 130 and terms of information (e.g., ASI and/or app state IDs) included in the records. As described with reference to FIGS. 7B-7C, the search system 100 may further identify the app state records such that each record specifies an app state for which the current app state, as specified by the indication 132, is a parent app state. As explained herein, a parent app state of another app state may refer to an app state that is higher in an app state hierarchy associated with the corresponding native app than the other app state. Examples of parent app states of other app states are described with reference to FIGS. 6A-6B.

To identify the app state records of the consideration set such that each record matches the search query 130 and specifies an app state for which the current app state is a parent app state, the search system 100 (e.g., the set generation module 140) may use any of a variety of techniques. As one example, with reference to FIG. 7B, each app state record included in the search data store 112 may indicate one or more parent app states associated with the app state specified by the record (e.g., as shown in FIG. 5A). In this example, the search system 100 (e.g., the set generation module 140) may identify the app state records of the consideration set based on matches between the indication of the current app state 132 received from the user device 102 and one or more parent app states indicated by the records. In other words, as shown in block 702B of FIG. 7B, the search system 100 may identify the app state records such that each record both matches the search query 130 and indicates the current app state, as specified by the indication 132, as a parent app state of the app state specified by the record. As another example, with reference to FIG. 7C, the search system 100 may identify the app state records of the consideration set using the app state determination system 108. In this example, as shown in block 702C of FIG. 7C, the app state determination system 108 may initially determine one or more child app states for which the current app state is a parent app state using the indication 132. The app state determination system 108 may make this determination based on the indication 132 and using an app state graph (or, e.g., another representation of app state hierarchy) of the native app associated with the current app state (e.g., as shown in FIG. 6A). The app state determination system 108 may then transmit (e.g., indications of) the determined child app states to the search system 100. In block 704C, using (e.g., the indications of) the determined child app states, the search system 100 may identify the app state records such that each record both matches the search query 130 and specifies one of the determined states.

Referring back to FIG. 7A, the search system 100 (e.g., the set processing module 142) may process the consideration set. Specifically, in block 708A, the search system 100 may generate one or more result scores for the app state records included in the consideration set (e.g., generate a result score for each record). In block 710A, the search system 100 may then select one or more app state records from the consideration set based on the one or more result scores associated with the selected records (e.g., select one or more records having the highest, or largest, one or more scores). In block 712A, the search system 100 (e.g., the result generation module 114) may select one or more AMs from the selected app state records (e.g., select one or more AAMs, WAMs, and/or ADAs from each selected record). In some examples, the search system 100 may also select other information from the selected app state records, such as result scores and/or link data associated with the records. In block 714A, the search system 100 (e.g., the result generation module 114) may generate one or more search results 134 that include the selected AMs (e.g., AAM(s)). For example, the search system 100 may generate the search results 134 such that each result 134 includes one or more AMs (and, e.g., other information) selected from each selected app state record. In some examples, the search system 100 may include indications of user interaction distances associated with selected app state records as part of the search results 134, as described herein. In block 716A, the search system 100 (e.g., the result generation module 114) may transmit the search results 134 to the user device 102.

Figure 8:
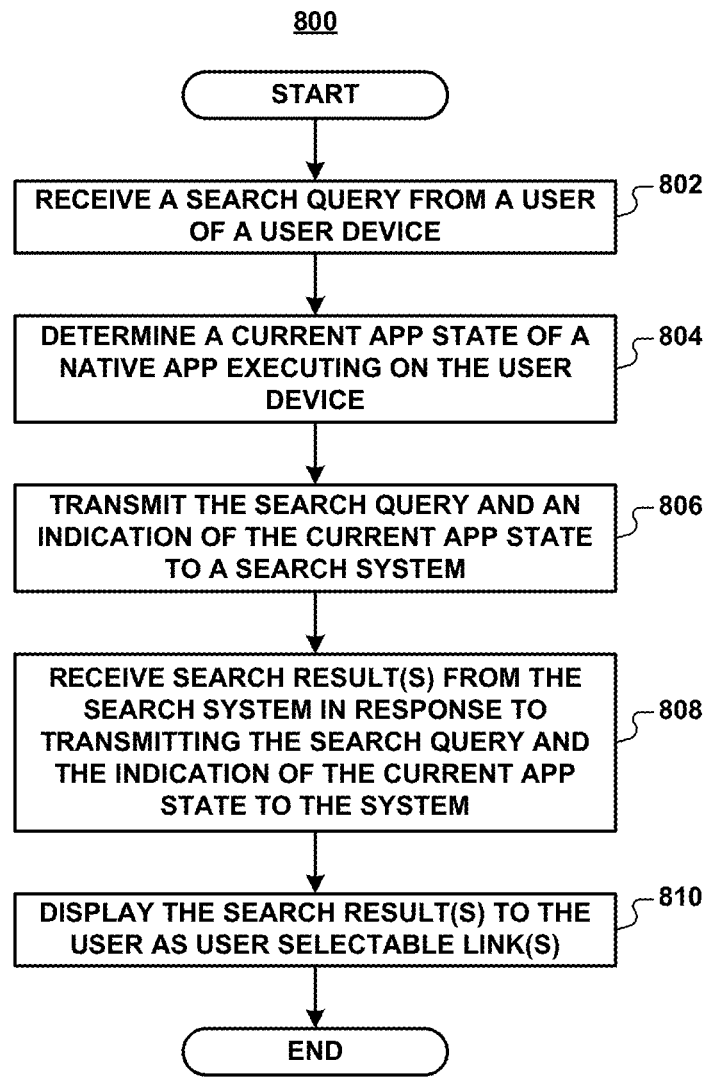
FIG. 8 is a flow diagram that illustrates an example method for generating search results using a search query and an indication of a current app state at a user device.

FIG. 8 is a flow diagram that illustrates an example method 800 for generating search results 134 at a user device 102 based on a search query 130 received from a user and an indication of a current app state 132 of a native app executing on the device 102. As shown in FIG. 8, in block 802, the user device 102 may initially receive a search query 130 (e.g., a text string) from a user of the device 102. For example, the user device 102 may receive the search query 130 via a search app 124 executing on the device 102 (e.g., via a GUI of the app 124). In block 804, the user device 102 may determine a current app state of a native app (e.g., any of the native app(s) 126) executing on the device 102. In some examples, the user device 102 may determine the current app state in response to receiving the search query 130 from the user. In other examples, the user device 102 may determine the current app state prior to receiving the search query 130 from the user (e.g., upon the user launching the search app 124 on the device 102). In still other examples, the user device 102 may determine the current app state after receiving the search query 130 from the user (e.g., upon the user selecting a search button of the GUI of the search app 124 that causes the device 102 to transmit the query 130 and an indication of the current app state 132 to the search system 100). In general, the user device 102 may determine the current app state in response to receiving any type of user input from the user. Additionally, or alternatively, the user device 102 may automatically determine the current app state during the course of operation of the device 102 (e.g., at predetermined time intervals). In some examples, the indication of the current app state 132 may be readily available to the user device 102 (e.g., accessible at a given memory location of the device 102, or via cloud storage). In other examples, the user device 102 may perform one or more operations to determine the current app state (e.g., poll the corresponding native app, OS 120, and/or other resources included on the device 102 or accessible via cloud storage) and generate the indication 132.

In block 806, the user device 102 may transmit the search query 130 and the indication of the current app state 132 to the search system 100. For example, the user device 100 may transmit the search query 130 and indication 132 jointly (e.g., as part of the query wrapper), or separately. In some examples, the indication 132 may include textual, numerical, and/or machine-readable (e.g., binary) data that specifies (e.g., describes) the current app state. As a specific example, the indication 132 may include an app state ID that identifies an app state record included in the search data store 112 that specifies the current app state. In other examples, the indication 132 may include an AAM that specifies the current app state (e.g., references the corresponding native app and indicates one or more operations for the app to perform, which sets the app into the state). In a specific example where the user device 102 displays a GUI associated with an entry in Yelp for the restaurant "Amarin Thai Cuisine" located in Mountain View, Calif., the indication 132 may include the string "yelp:///biz/amarin-thai-cuisine-mountain-view." The user device 102 may generate the AAM as part of determining the current app state (e.g., by interacting with the corresponding native app and/or the OS 120) or retrieve the AAM (e.g., from the corresponding app state record included in the search data store 112) after determining the current app state.

In some examples, the current app state may not have a corresponding AAM. For example, the native app associated with the current app state may not be configured to receive AAMs that specify app states of the app (e.g., that reference the app and indicate operations for the app to perform, which sets the app into the states). In these examples, the indication 132 may include one or more operations that, when performed by the native app, set the app into the current app state. For example, the operations may be represented as one or more text strings (e.g., instructions, or code) or in another form (e.g., using a machine-readable representation). In some examples, the operations may correspond to one or more user interactions with (e.g., user inputs to) the native app that led a user from a main app state (e.g., a home page) of the app to the current app state. In these examples, the user device 102 may determine the operations by recording (e.g., monitoring) the user interactions as they occur at the device 102.

In additional examples, the indication 132 may include a compressed version of the textual, numerical, and machine-readable data, AAMs, and/or operations described herein. In these examples, the search system 100 may receive the indication 132 and decompress (e.g., decode) the compressed information described therein to determine the current app state. In other examples, the indication 132 may include other data associated with the current app state that indicates the state to the search system 100 in some manner.

As described herein, upon receiving the indication of the current app state 132 from the user device 102, the search system 100 may determine the current app state based on the indication 132 (and, e.g., other data). In some examples, the search system 100 may directly determine the current app state using textual, numerical, and/or machine-readable data (e.g., an app state ID) included in the indication 132. In other examples, the search system 100 may determine the current app state based on an AAM included in the indication 132 (e.g., by setting a version of the native app associated with the state into the state using the AAM). In still other examples, the search system 100 may determine the current app state based on one or more operations included in the indication 132 (e.g., by inputting the operations into a version of the native app associated with the state until the app is set into the state). In some examples, the search system 100 may use the AAM and/or the operations as inputs into a version (e.g., a copy) of the native app associated with the current app state, or a virtual machine (VM) implementation (e.g., a model, or an emulation) of the app, either of which may execute on the system 100 and/or at a remote computing resource accessible by the system 100. Like the native app itself, these versions of the app may be capable of receiving the AAM as part of the indication 132 and being set into the current app state as a result. Additionally, or alternatively, these native app versions may be capable of receiving the operations as part of the indication 132 and recreating (e.g., "playing back") the corresponding user interactions to elucidate (e.g., via introspection) the current app state. In other examples, the search system 100 may use the AAM and/or the operations as inputs into a state machine present on the system 100 and/or at a remote computing resource accessible by the system 100. The state machine may represent (e.g., include therein) one or more popular app states of native apps and/or user interactions in the apps (e.g., transitions among the app states). In these examples, the state machine may be capable of receiving the AAM and/or the operations as part of the indication 132 and being set into a state that corresponds to the current app state as a result.

In the example of FIG. 8, the search system 100 may receive the search query 130 and the indication of the current app state 132 from the user device 102 and generate one or more search results 134 based on the query 130 and indication 132 (e.g., based on the current app state determined using the indication 132). As described herein, the search results 134 may include one or more AMs (e.g., AAMs, WAMs, and/or ADAs), result scores, and link (e.g., image and/or text) data. The search system 100 may then transmit the search results 134 to the user device 102. Accordingly, in block 808, the user device 102 may receive the search results 134 from the search system 100 in response to transmitting the search query 130 and the indication 132 to the system 100. In block 810, the user device 102 may display the search results 134 to the user as one or more user selectable links. In this example, each user selectable link may include one or more of the AMs (e.g., an AAM) included in the search results 134 and, e.g., the link data also received as part of the results 134. The user device 102 may further rank (e.g., order) the user selectable links using the associated result scores also received as part of the search results 134. As a result, the user device 102 may rank the user selectable links based on relevance of the search results 134 to the search query 130 and, e.g., user interaction distance, as indicated by the result scores. In other examples, user device 102 may rank the user selectable links using indications of user interaction distances also received as part of the search results 134.

The user may select one or more of the user selectable links displayed to the user on the user device 102. In response to detecting that the user has selected a particular one of the user selectable links, the user device 102 may set the native app associated with the current app state (e.g., by first launching the app in the event that it is no longer executing on the device 102) into an app state that is specified by the selected link (e.g., by an AAM included in the link), and for which the current app state is a parent app state, as described herein.

FIGS. 9-11C illustrate additional examples in which the app state filtering techniques described herein may be performed by a user device 102 rather than by the search system 100, which may enhance user privacy and reduce complexity of the system 100. In these examples, the user device 102 may transmit the search query 130 to the search system 100 without also transmitting the indication of the current app state 132. The search system 100 may generate search results 134 that are responsive to the search query 130, in a similar manner as described herein, and transmit the results 134 to the user device 102. The user device 102 may filter the search results 134 using the indication of the current app state 132. Specifically, the user device 102 may render as user selectable links and display only those of the search results 134 that correspond to app states for which the current app state, as specified by the indication 132, is a parent app state. As one example, each search result 134 received from the search system 100 may indicate one or more parent app states of the app state corresponding to the result 134 (e.g., as indicated by the corresponding app state record). In this example, using the indication 132, the user device 102 may render as user selectable links and display only those of the search results 134 that indicate the current app state as a parent app state. As another example, the app state determination system 108 may determine one or more child app states for which the current app state, as specified by the indication 132, is a parent app state using the indication 132 and, e.g., an app state graph or an equivalent data structure. The app state determination system 108 may then indicate the determined child app states to the user device 102. Using the determined child app states (e.g., indications thereof), the user device 102 may render as user selectable links and display only those of the search results 134 that specify any of the states. In some examples, the user device 102 may further rank the displayed search results 134 based on user interaction distances between the corresponding app states and the current app state and/or relevance of each result 134 to the search query 130. In the examples described above, the app state determination system 108 may be a part of the user device 102, or a stand-alone system or device.

Figure 9:
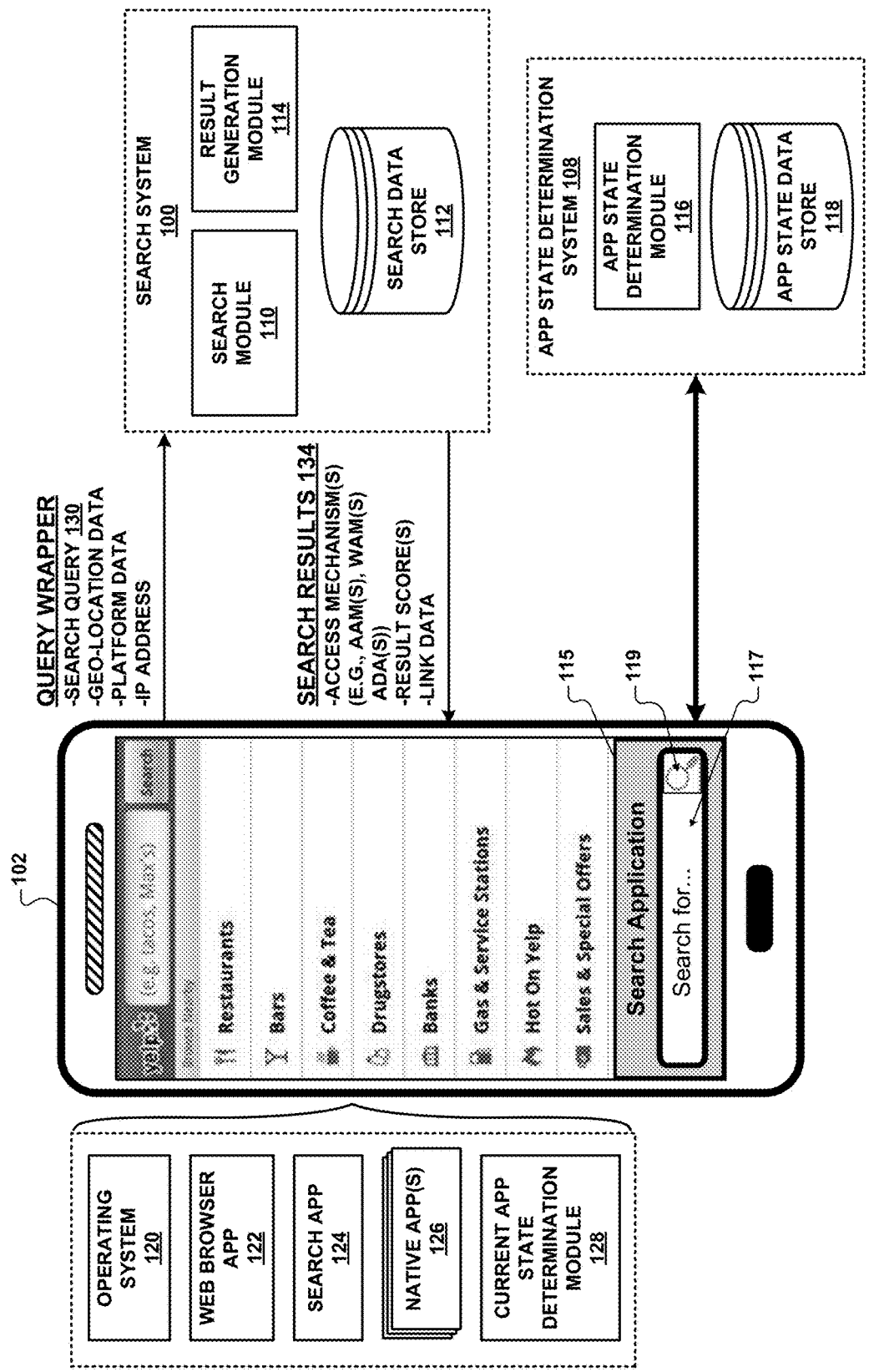
FIG. 9 illustrates another example user device in communication with an example search system and an example app state determination system.

FIG. 9 illustrates another example of one of the user device(s) 102 in communication with the search system 100 and app state determination system 108. The example of FIG. 9 includes some of the same features and user interactions as those described with reference to FIG. 2. As shown in FIG. 9, the user device 102 may transmit a query wrapper to the search system 100, including a search query 130, geo-location data, platform data, and/or other data (e.g., an IP address) associated with a user of the device 102, the device 102, and/or the query 130. Upon receiving the query wrapper from the user device 102, the search system 100 may generate one or more search results 134 based on the search query 130 included in the wrapper. As described herein, to generate the search results 134, the search system 100 may identify one or more app state records included in the search data store 112 using the search query 130. The search system 100 may then transmit the search results 134 to the user device 102. The user device 102 may receive the search results 134 from the search system 100. As shown in FIG. 9, the search results 134 may include one or more AMs (e.g., AAMs, WAMs, and/or ADAs), result scores, link data, and/or other information. In this example, the user device 102 (e.g., the search app 124) may further determine a current app state of a native app executing on the device 102, in a similar manner as described with reference to FIG. 2. The user device 102 (e.g., using the app state determination system 108) may then filter the received search results 134 based on the determined current app state, as described with reference to FIGS. 11A-11C. The user device 102 may subsequently display the filtered search results as one or more user selectable links.

Figure 10:
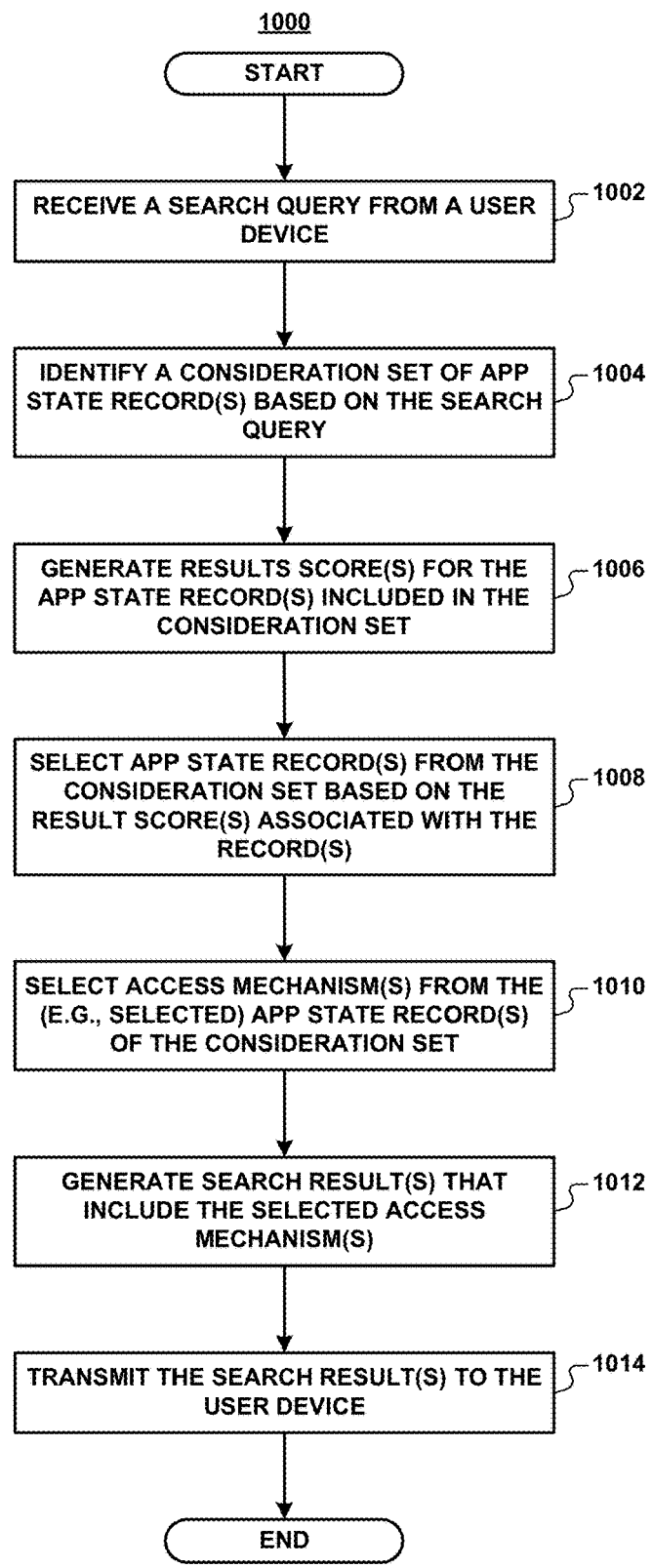
FIG. 10 is a flow diagram that illustrates an example method for generating search results using a search query at a search system.

FIG. 10 is a flow diagram that illustrates an example method 1000 for generating search results 134 at a search system 100 based on a search query 130 received from a user device 102. In block 1002, the search system 100 may initially receive a search query 130 specified by a user from a user device 102. In some examples, the search system 100 may perform an analysis of the search query 130. In other examples, the search system 100 may also receive other information from the user device 102, such as user information and/or geo-location, platform, and IP address information associated with the user device 102. In block 1004, the search system 100 may identify a consideration set of one or more app state records included in the search data store 112 based on the (e.g., analyzed) search query 130. In this example, each identified app state record may specify an app state of a native app. For example, the search system 100 may identify the app state records based on matches between terms of the search query 130 and terms of information (e.g., ASI and/or app state IDs) included in the records.

The search system 100 may then process the consideration set. Specifically, in block 1006, the search system 100 may generate one or more result scores for the app state records included in the consideration set. In block 1008, the search system 100 may then select one or more app state records from the consideration set based on the one or more result scores associated with the selected records. In block 1010, the search system 100 may select one or more AMs (e.g., AAMs) from the selected app state records. In some examples, the search system 100 may also select other information from the selected app state records, such as result scores and/or link data associated with the records. In block 1012, the search system 100 may generate one or more search results 134 that include the selected AMs (e.g., AAMs) and, e.g., other information selected from the app state records. In block 1014, the search system 100 may transmit the search results 134 to the user device 102.

Figure 11A:
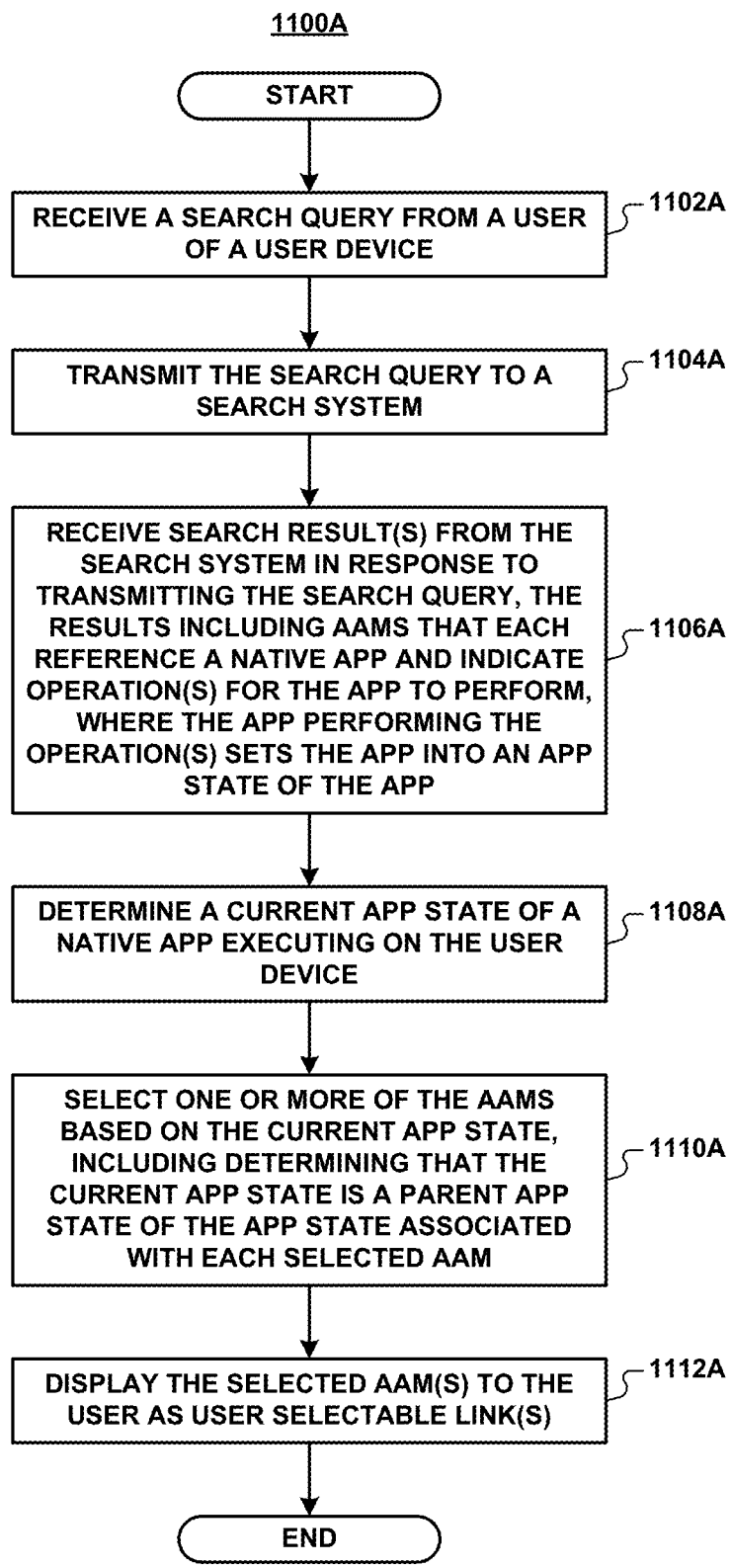

FIGS. 11A-11C are flow diagrams that illustrate example methods 1100A-1100C, respectively, for generating search results 134 at a user device 102 based on a search query 130 received from a user and an indication of a current app state 132 of a native app executing on the device 102. FIG. 11A illustrates an example method 1100A for generating the search results 134. FIGS. 11B-11C illustrate examples of one or more particular aspects of the method 1100A.

With reference to FIG. 11A, in block 1102A, the user device 102 may initially receive a search query 130 from a user of the device 102. In block 1104A, the user device 102 may transmit the search query 130 to the search system 100. The search system 100 may receive the search query 130 from the user device 102 and generate one or more search results 134 based on the query 130. As described herein, the search results 134 may include one or more AMs (e.g., AAMs, WAMs, and/or ADAs), result scores, and link (e.g., image and/or text) data. The search system 100 may then transmit the search results 134 to the user device 102. Accordingly, in block 1106A, the user device 102 may receive the search results 134 from the search system 100 in response to transmitting the search query 130 to the system 100. In this example, the search results 134 may include AAMs that each reference a native app and indicate one or more operations for the app to perform, as described herein. Also in this example, the native app performing the operations sets the app into an app state of the app, as also described herein.

In block 1108A, the user device 102 may determine a current app state of a native app executing on the device 102, in a similar manner as described with reference to the method 700A. For example, the user device 102 may generate an indication of the current app state 132, also in a similar manner as described with reference to the method 700A. In block 1110A, the user device 102 may select one or more of the AAMs based on the current app state. In particular, to select each AAM, the user device 102 may determine that the current app state, as specified by the indication 132, is a parent app state of the app state associated with the AAM, in a similar manner as described with reference to the method 700A. To make this determination, the user device 102 may use any of a variety of techniques. As one example, with reference to FIG. 11B, each AAM included in the search results 132 may indicate one or more parent app states of the app state associated with the AAM. In this example, the user device 102 may select the AAMs based on matches between the indication of the current app state 132 and one or more parent app states indicated by the AAMs. In other words, as shown in block 1102B of FIG. 11B, the user device 102 may select one or more of the AAMs such that each selected AAM indicates the current app state, as specified by the indication 132, as a parent app state of the app state associated with the AAM. As another example, with reference to FIG. 11C, the user device 102 may select the AAMs using the app state determination system 108. In this example, as shown in block 1102C of FIG. 11C, the app state determination system 108 may initially determine one or more child app states for which the current app state is a parent app state using the indication 132, in a similar manner as described with reference to the method 700C. For example, the user device 102 may transmit the indication 132 to the app state determination system 108. The app state determination system 108 may then transmit (e.g., indications of) the determined child app states to the user device 102. In block 1104C, using (e.g., the indications of) the determined child app states, the user device 102 may select one or more of the AAMs such that each selected AAM is associated with one of the determined states.

In block 1112A, the user device 102 may display the selected AAMs to the user as one or more user selectable links. In this example, each user selectable link may include one of the selected AAMs and, e.g., link data and/or other information also received as part of the corresponding search result 134. The user device 102 may further rank the user selectable links using the associated result scores and/or indications of user interaction distances also received in the search results 134, as described herein. The user may select one of the user selectable links, upon which the user device 102 may set the native app associated with the current app state into the app state specified by the selected link (e.g., by the selected AAM included in the link), which may also be forward-reachable from the current app state.

Figures 12A, 12B, 12C:
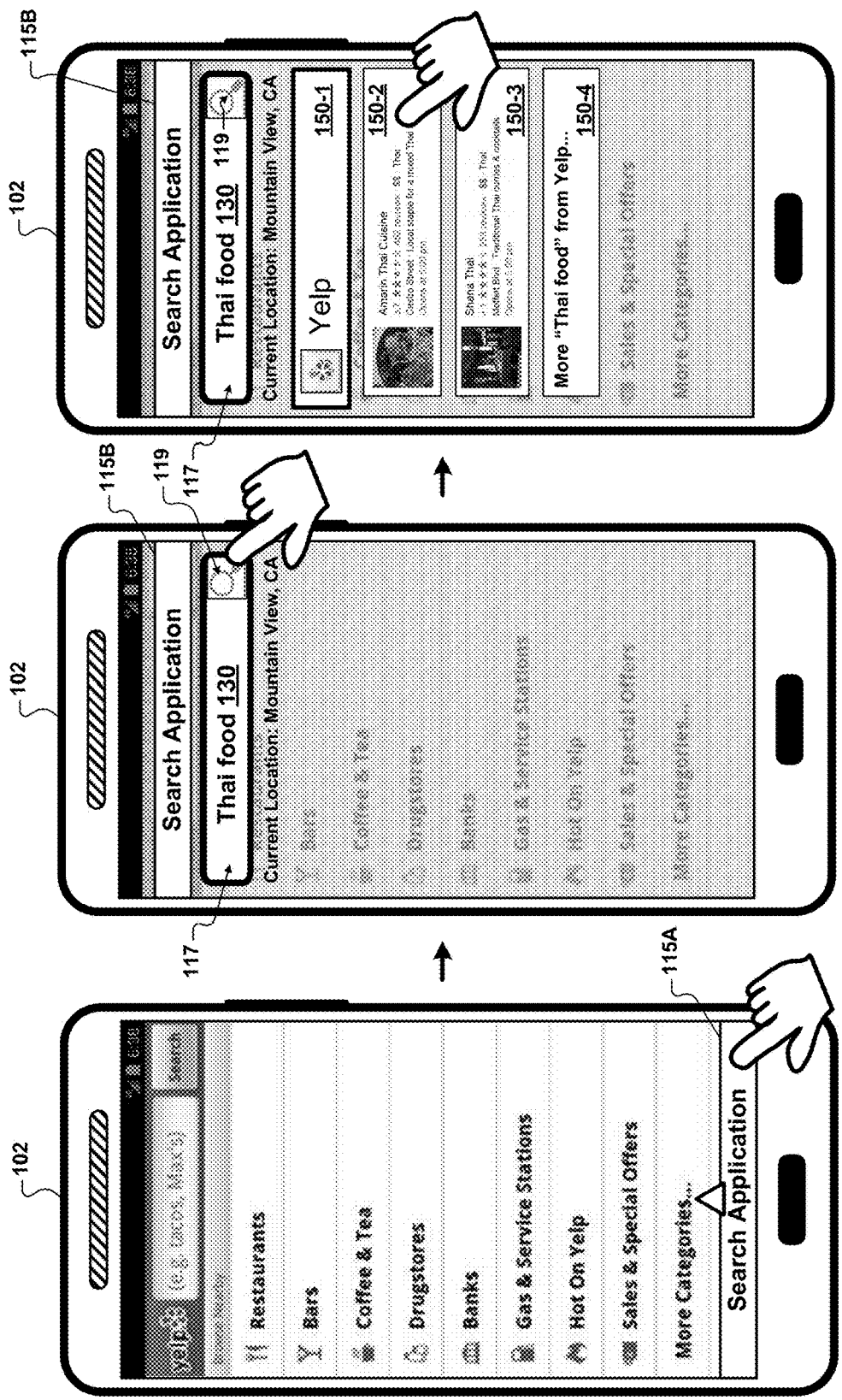

FIGS. 12A-15C illustrate example GUIs that may be generated on a user device 102 according to the present disclosure. Specifically, the examples of FIGS. 12A-15C depict a user device 102 performing a search for app states of native apps based on a user-specified search query 130 and an indication of a current app state 132 of a native app executing on the device 102. In the example of FIGS. 12A-12C, the current app state corresponds to a main (e.g., home) page of Yelp. As shown in FIG. 12A, while the user device 102 displays the current app state, a user of the device 102 invokes (e.g., launches) a search app 124 by interacting with a GUI element 115A also displayed on the device 102. As shown in FIG. 12B, this user interaction results in the search app 124 being launched (or maximized) on the user device 102 and a GUI 115B of the app 124 being displayed over (e.g., overlaid with respect to) the current app state on the device 102. In other words, the user interaction results in the GUI 115B of the search app 124 being displayed on the user device 102 with the current app state continuing to execute on the device 102 in the background. As also shown, the user enters a search query "Thai food" 130 into the GUI 115B and further interacts with the GUI 115B to cause the search app 124 to transmit the query 130 and an indication of the current app state 132 to a search system 100. As shown in FIG. 12C, the user device 102 receives search results 134 from the search system 100 in response to transmitting the search query 130 and the indication 132 and displays the results 134 to the user as user selectable links. In the example of FIGS. 12A-12C, the search results 134 are both responsive to the search query 130 (i.e., the text string "Thai food") and specify app states that are forward-reachable from the current app state depicted in FIG. 12A (i.e., the main page of Yelp). Specifically, the search results 134 correspond to app states, or entries, in Yelp for restaurants "Amarin Thai Cuisine" and "Shana Thai" that serve Thai food. The search results 134 are also limited to app states that are forward-reachable from (e.g., lower in an app state hierarchy of Yelp than) the main page of Yelp. In some examples, the search results 134 may also be ranked by user interaction distance and/or relevance to the search query 130.

In some examples, the GUI element 115A and/or the GUI 115B of the search app 124 may be embedded in the native app (e.g., Yelp) executing on the user device 102. In other words, in these examples, one or more GUIs associated with the search app 124 may be a part of the native app executing on the user device 102, rather than a part of a stand-alone search app 124. In these examples, instead of invoking a separate search app 124 while viewing the current app state on the user device 102, the user may interact with (e.g., enter search queries 130 into and submit the queries 130 via) a GUI that is displayed directly in the current app state.

In the example of FIGS. 13A-13C, the current app state corresponds to a page of Yelp for nearby restaurants (e.g., restaurants located near the user's current geographic location). The user may have reached this page from the main (e.g., home) page of Yelp via one or more user interactions. As shown in FIG. 13A, the user invokes the search app 124 by interacting with the GUI element 115A displayed alongside the current app state. As shown in FIG. 13B, as a result, the user device 102 launches (or maximizes) the search app 124 and displays the GUI 115B of the app 124 over the current app state. As also shown, the user then enters a search query "Pad Thai" 130 into the GUI 115B and causes the search app 124 to transmit the query 130 and an indication of the current app state 132 to the search system 100. As shown in FIG. 13C, search results 134 received by the user device 102 from the search system 100 in response to transmitting the search query 130 and the indication 132 correspond to app states, or entries, in Yelp for restaurants "Lanna Thai" and "Yeung Shing" that are located near the user and include Pad Thai on their menu. In other words, the search results 134 correspond to app states in Yelp that are responsive to the search query 130 and forward-reachable from the "nearby restaurants" page of Yelp. As also shown in FIG. 13C, user selectable links used to display the search results 134 on the user device 102 are ranked (e.g., ordered) by user interaction distances associated with the corresponding app states. In particular, as shown in FIG. 13C, the search results 134 also specify app states for menus of the above-described restaurants. In this example, the menu app states are farther from the "nearby restaurants" page of Yelp in terms of user interaction distance (e.g., require relatively more user inputs to be reached from "nearby restaurants" page) than the app states for the corresponding restaurants. As a result, user selectable links associated with the menu app states are ranked (e.g., ordered) lower than user selectable links associated with the app states for the restaurants, as depicted in FIG. 13C. Additionally, or alternatively, the search results 134 (e.g., the user selectable links) may be ranked by their relevance to the search query 130, as also described herein.

In the example of FIGS. 14A-14C, the current app state corresponds to a page of Yelp for popular (i.e., "hot and new") restaurants, which the user may have reached from the main (e.g., home) page of Yelp via one or more user interactions. In this example, the user-specified search query 130 is "Posh Bagel." Also in this example, search results 134 received by the user device 102 in response to transmitting the search query 130 and an indication of the current app state 132 to the search system 100 correspond to app states, or entries, in Yelp for "hot and new" restaurants (i.e., app states that are forward-reachable from the "hot and new" page) named "Posh Bagel." In the example of FIGS. 14A-14C, user selectable links used to display the search results 134 on the user device 102 are ranked (e.g., ordered) by user-specified popularity. Specifically, as shown in FIG. 14C, a user selectable link associated with an app state of Yelp for a "Posh Bagel" restaurant located in Mountain View, Calif. that the user has previously indicated as popular (as indicated by the GUI element 121) is ranked (e.g., ordered) higher than a user selectable link associated with an app state for another "Posh Bagel" restaurant. In other examples, the search results 134 (e.g., the user selectable links) may also be ranked by their user interaction distance and/or relevance to the search query 130.

In the example of FIGS. 15A-15C, the current app state corresponds to an entry in Yelp for a restaurant "Amarin Thai Cuisine" located in Mountain View, Calif. In this example, the user-specified search query 130 is "Pad Thai." As shown in FIG. 15A, the user specifies (e.g., enters) the search query 130 by interacting with the GUI 115A of the search app 124 (i.e., a search bar 117 of the GUI 115A) displayed alongside the current app state. The user then causes the search app 124 to transmit the search query 130 and an indication of the current app state 132 to the search system 100 (e.g., by selecting a search button 119 of the GUI 115A). As shown in FIG. 15B, search results 134 received by the user device 102 from the search system 100 in response to transmitting the search query 130 and the indication 132 correspond to app states, or entries, in Yelp that are forward-reachable from the current app state depicted in FIG. 15A. Specifically, the search results 134 correspond to app states of Yelp for a menu and restaurant reviews associated with the particular "Amarin Thai Cuisine" restaurant. As shown in FIG. 15B, the user may select a user selectable link associated with the app state for the menu. As shown in FIG. 15C, upon the user selecting the user selectable link, the user device 102 may set Yelp into the app state 123 that displays the menu.

In some examples, the search system 100 may generate additional search results that include content that is not associated with app states of native apps (e.g., content related to apps, web sites, documents, and/or media files). In these examples, the search system 100 may identify one or more records (e.g., app records, or other data structures) stored in a data store that include the content based on the search query 130, in a similar manner as described above.

In additional examples, the current app state may correspond to an app state (e.g., a web page) of a web-based app executing on the user device 102 (e.g., via the web browser app 122). In these examples, the search system 100 may generate search results that both match the search query 130, as described herein, and specify states of the web-based app that are forward-reachable from the current app state, in a similar manner as described herein with reference to using an indication of a current app state 132 of a native app to generate the search results 134.

The modules and data stores included in the search system 100 and app state determination system 108 represent features that may be included in these systems 100, 108 as they are described in the present disclosure. For example, the search module 110, search data store 112, and result generation module 114 may represent features included in the search system 100. Similarly, the app state determination module 116 and app state data store 118 may represent features included in the app state determination system 108. The modules and data stores described herein may be embodied by electronic hardware, software, and/or firmware components. Depiction of different features as separate modules and data stores does not necessarily imply whether the modules and data stores are embodied by common or separate electronic hardware, software, and/or firmware components. In some implementations, the features associated with the one or more modules and data stores depicted herein may be realized by common or separate electronic hardware, software, and/or firmware components.

The modules and data stores may be embodied by electronic hardware, software, and/or firmware components including, but not limited to, one or more processing units, memory components, input/output (I/O) components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, solid state drives (SSDs), hard disk drives (HDDs), magnetic tape drives, optical storage technology (e.g., compact disc, digital versatile disc, and/or Blu-ray disc), and/or any other memory components.

The memory components may include (e.g., store) the data described herein. For example, the memory components may store the data included in the app state records of the search data store 112 and/or the data included in the app state data store 118. The memory components may also include instructions that may be executed by the processing units. For example, the memory components may include computer-readable instructions that, when executed by the processing units, cause the units to perform the various functions attributed to the modules and data stores described herein.

The I/O components may refer to electronic hardware, software, and/or firmware that provide communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components may include hardware, software, and/or firmware configured to communicate with various human interface devices, including display screens, keyboards, pointer devices (e.g., a mouse), touchscreens, speakers, and microphones. In other examples, the I/O components may include hardware, software, and/or firmware configured to communicate with additional devices, such as external memory (e.g., external HDDs).

In some implementations, the search system 100 and/or app state determination system 108 may be a system of one or more computing devices (e.g., a computer search system) configured to implement the techniques described herein. Put another way, the features attributed to the modules and data stores described herein may be implemented by one or more computing devices. Each computing device may include any combination of electronic hardware, software, and/or firmware described herein. For example, each computing device may include any combination of the processing units, memory components, I/O components, and interconnect components described herein. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the search system 100 and/or app state determination system 108 may be configured to communicate with the network 106. The computing devices may also be configured to communicate with one another via a computer network. In some examples, the computing devices may include one or more server computing devices configured to communicate with the user device(s) 102 (e.g., receive search queries 130 and indications of current app states 132, and transmit search results 134), gather data from the data source(s) 104, index the data, store the data, and store other documents. The computing devices may reside in a single machine or in multiple machines at a single geographic location, or be distributed across a number of geographic locations.

Additionally, the various implementations of the search system 100 and app state determination system 108 described herein (e.g., using one or more computing devices that include one or more processing units, memory components, I/O components, and interconnect components) are equally applicable to any of the user device(s) 102 and components thereof.

What is claimed is:

1. A method comprising:
   receiving a search query from a user device;
   receiving an indication, of a current application (app) state of a native app currently executing on the user device, from the user device;
   identifying one or more app state records, based on the search query and the indication, wherein each of the one or more app state records includes an app access mechanism (AAM) and app state information (ASI), wherein the AAM references the native app currently executing on the user device and indicates one or more operations for the native app to perform, wherein the ASI describes an app state of the native app after the native app has performed the one or more operations, and wherein the identifying of the one or more app state records based on the search query and the indication comprises identifying the one or more app state records including the ASI describing the app state which is a child app state of the current app state; and
   transmitting the AAM included in the one or more app state records to the user device,
   wherein the identifying of the one or more app state records including the ASI describing the app state which is the child app state of the current app state comprises:
      determining one or more child app states of the native app currently executing on the user device for which the current app state is a parent app state, and
      determining that the app state described by the ASI included in each of the one or more app state records comprises one of the determined one or more child app states.

2. The method of claim 1, wherein the indication of the current app state comprises one or more of textual data, numerical data, or machine-readable data specifying the current app state.

3. The method of claim 1,
   wherein the indication of the current app state comprises an app state identifier (ID) included in an app state record specifying the current app state, and
   wherein the app state ID is configured to identify the app state record.

4. The method of claim 1,
   wherein the indication of the current app state comprises an AAM that references the native app executing on the user device and indicates the one or more operations for the native app to perform, and
   wherein performing the one or more operations sets the native app into the current app state.

5. The method of claim 1, wherein the indication of the current app state comprises an indication of one or more operations, performed by a user of the user device with respect to the native app executing on the user device, to set the native app into the current app state.

6. The method of claim 1, wherein the receiving of the indication of the current app state comprises receiving the indication and determining the current app state using the indication and a version of the native app executing at a search system.

7. The method of claim 1, wherein the receiving of the indication of the current app state comprises receiving the indication and determining the current app state using the indication and a virtual machine (VM) version of the native app executing at a search system.

8. The method of claim 1, wherein the identifying of the one or more app state records including the ASI describing the app state which is the child app state of the current app state comprises identifying the one or more app state records including the ASI describing the app state which is forward-reachable from the current app state in the native app executing on the user device via one or more user interactions.

9. The method of claim 1, wherein the identifying of the one or more app state records including the ASI describing the app state which is the child app state of the current app state comprises identifying the one or more app state records including the ASI describing the app state which is lower in an app state hierarchy associated with the native app executing on the user device relative to the current app state.

10. The method of claim 1,
    wherein each of the one or more app state records indicates a parent app state of the app state described by the ASI included in each of the one or more app state records, and
    wherein the identifying of the one or more app state records including the ASI describing the app state which is the child app state of the current app state comprises identifying the one or more app state records which indicate the current app state as the parent app state of the app state described by the ASI included in each of the one or more app state records.

11. The method of claim 1,
    further comprising retrieving an indication of a hierarchy of one or more app states of the native app currently executing on the user device,
    wherein the determining of the one or more child app states of the native app for which the current app state is the parent app state comprises determining based on the indication of the current app state and based on the indication of the hierarchy.

12. The method of claim 1, wherein the identifying of the one or more app state records based on the search query and the indication comprises identifying each of the one or more app state records based on one or more matches between one or more terms of the search query and one or more terms of the ASI included in each of the one or more app state records.

13. The method of claim 1, further comprising:
    determining a user interaction distance between the current app state and the app state described by the ASI included in each of the one or more app state records, wherein the user interaction distance indicates a number of user interactions required to reach the app state described by the ASI from the current app state, and
    transmitting an indication of the user interaction distance to the user device.

14. A method comprising:

transmitting, using a user device, a search query to a search system;

receiving search results from the search system at the user device in response to the transmitting of the search query, wherein the search results include application (app) access mechanisms (AAMs) that each reference a native app and indicate one or more operations for the native app to perform, and wherein the performing of the one or more operations sets the native app into an app state;

determining, using the user device, a current app state of the native app currently executing on the device;

selecting, using the user device, one or more of the AAMs based on the current app state, wherein the selecting of the one or more of the AAMs comprises identifying the one or more of the AAMs associated with an app state which is a child app state of the current app state; and displaying the selected one or more of the AAMs at the user device, wherein the identifying of the one or more of the AAMs associated with the app state which is the child app state of the current app state comprises:

determining one or more child app states of the native app currently executing on the user device for which the current app state is a parent app state, and determining that the app state associated with each of the one or more of the AAMs comprises one of the determined one or more child app states.

15. The method of claim 14, wherein the identifying of the one or more of the AAMs associated with the app state which is the child app state of the current app state comprises one or more of:

identifying the one or more of the AAMs associated with an app state which is forward-reachable from the current app state in the native app currently executing on the user device via one or more user interactions; or identifying the one or more of the AAMs associated with an app state which is lower in an app state hierarchy associated with the native app relative to the current app state.

16. The method of claim 14, wherein each of the one or more of the AAMs indicates a parent app state of the app state associated with each of the one or more of the AAMs, and wherein the identifying of the one or more of the AAMs associated with the app state which is the child app state of the current app state comprises identifying the one or more of the AAMs indicating the current app state as the parent app state of the app state associated with the one or more of the AAMs.

17. The method of claim 14, further comprising:

determining a user interaction distance between the current app state and the app state associated with each of the selected one or more of the AAMs, wherein the user interaction distance indicates a number of user interactions required to reach the app state associated with each of the selected one or more of the AAMs from the current app state, and displaying each of the selected one or more of the AAMs based on the determined user interaction distance.

18. A system comprising one or more computing devices, wherein the system is configured to:

receive a search query from a user device;

receive an indication, of a current application (app) state of a native app currently executing on the user device, from the user device;

identify one or more app state records, based on the search query and the indication, wherein each of the one or more app state records includes an app access mechanism (AAM) and app state information (ASI), wherein the AAM references the native app currently executing on the user device and indicates one or more operations for the native app to perform, wherein the ASI describes an app state of the native app after the native app has performed the one or more operations, and wherein to identify the one or more app state records based on the search query and the indication, the one or more computing devices are configured to identify the one or more app state records including the ASI describing the app state which is a child app state of the current app state;

and transmit the AAM included in the one or more app state records to the user device, wherein in order to identify the one or more app state records including the ASI describing the app state which is the child app state of the current app state, the system is further configured to:

determine one or more child app states of the native app currently executing on the user device for which the current app state is a parent app state, and determine that the app state described by the ASI included in each of the one or more app state records comprises one of the determined one or more child app states.

\* \* \* \* \*